(12) United States Patent
Faulkner et al.

(10) Patent No.: US 11,018,884 B2
(45) Date of Patent: May 25, 2021

(54) INTERACTIVE TIMELINE THAT DISPLAYS REPRESENTATIONS OF NOTABLE EVENTS BASED ON A FILTER OR A SEARCH

(71) Applicant: Microsoft Technology Licensing, LLC, Redmond, WA (US)

(72) Inventors: Jason Thomas Faulkner, Seattle, WA (US); Thomas Bouchard, Seattle, WA (US); Casey Baker, Seattle, WA (US); Sonu Arora, Kirkland, WA (US); Kevin D. Morrison, Arlington, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 68 days.

(21) Appl. No.: 15/495,885

(22) Filed: Apr. 24, 2017

(65) Prior Publication Data

US 2018/0307383 A1    Oct. 25, 2018

(51) Int. Cl.
*G06F 3/048*    (2013.01)
*H04L 12/18*    (2006.01)
(Continued)

(52) U.S. Cl.
CPC ........ *H04L 12/1831* (2013.01); *G06F 16/745* (2019.01); *H04N 7/155* (2013.01); *G06F 3/04845* (2013.01); *H04N 7/15* (2013.01)

(58) Field of Classification Search
CPC .......... H04N 7/15; H04N 7/155; H04N 7/148; H04N 7/152; H04N 7/147; H04N 5/44591; H04N 21/2747; H04N 21/4788; H04N 21/8456; G06F 3/04842; G06F 16/4393; G06F 3/0481; G06F 11/3636;
(Continued)

(56) References Cited

U.S. PATENT DOCUMENTS 7,562,299 B2    7/2009 Millar et al.
8,745,499 B2    6/2014 Pendergast et al.
(Continued)

OTHER PUBLICATIONS

Jiangfeng et al., Event Detect on Online Video using Crowdsourced Time-Sync Comment; 2016, IEEE. 6 pages.*
(Continued)

*Primary Examiner* — Linh K Pham
(74) *Attorney, Agent, or Firm* — Newport IP, LLC; Jacob P. Rohwer

(57) ABSTRACT

Described herein is a system that enables a user to filter notable events, representations for which are presented on an interactive timeline associated with a teleconference session or a collaboration environment. The filtering can be implemented based on a type of a notable event and/or based on a specific notable event. The system is also configured to enable a user to search for instances of a type of event and instances of a specific notable event. The system is configured to provide results to the search request that list the teleconference sessions that include the located instances. The user can then select a teleconference session from the results to view an interactive timeline that includes representations of the located instances. Consequently, the system provides a tool that enables a user to efficiently and effectively locate events on an interactive timeline that are desirable (e.g., activity the user wants to view).

20 Claims, 18 Drawing Sheets

(51) Int. Cl.
*G06F 16/74* (2019.01)
*H04N 7/15* (2006.01)
*G06F 3/0484* (2013.01)

(58) Field of Classification Search
CPC .... G06F 9/44521; G06F 9/542; G06F 16/335; G06F 16/743; H04L 12/1831; H04L 12/1822; H04L 12/1818
See application file for complete search history.

(56) References Cited

U.S. PATENT DOCUMENTS

| | | | |
|---|---|---|---|
| 8,826,117 B1* | 9/2014 | Junee | G06F 3/04847 715/230 |
| 8,972,262 B1 | 3/2015 | Buryak | |
| 8,984,405 B1* | 3/2015 | Geller | G11B 27/34 715/719 |
| 2006/0106764 A1 | 5/2006 | Girgensohn et al. | |
| 2008/0046450 A1* | 2/2008 | Marshall | G06N 5/02 |
| 2010/0199182 A1* | 8/2010 | Lanza | H04N 21/8455 715/723 |
| 2011/0107369 A1* | 5/2011 | O'Brien | G06F 17/30029 725/38 |
| 2011/0122220 A1* | 5/2011 | Roberts | G06Q 10/10 348/14.04 |
| 2012/0166952 A1* | 6/2012 | Alexandrov | G06Q 10/101 715/730 |
| 2012/0173577 A1 | 7/2012 | Millar et al. | |
| 2012/0282951 A1* | 11/2012 | Nguyen | H04L 65/4015 455/457 |
| 2013/0004138 A1* | 1/2013 | Kilar | H04N 21/4788 386/230 |
| 2013/0091469 A1* | 4/2013 | Roberts | G06Q 10/10 715/835 |
| 2013/0097644 A1* | 4/2013 | Brande | H04N 21/6408 725/93 |
| 2013/0110565 A1* | 5/2013 | Means, Jr. | G06Q 10/06 705/7.11 |
| 2015/0373063 A1* | 12/2015 | Vashishtha | H04L 65/1089 348/14.07 |
| 2016/0073059 A1* | 3/2016 | Bader-Natal | H04L 65/4038 348/14.03 |
| 2016/0259854 A1 | 9/2016 | Liu et al. | |
| 2016/0357872 A1 | 12/2016 | Fader et al. | |
| 2017/0006327 A1 | 1/2017 | Aghdasi et al. | |
| 2017/0185574 A1* | 6/2017 | Fern | G06Q 10/103 |

OTHER PUBLICATIONS

Claude et al; Video Assist: a Customizable Tool for Analyzing Video Data; 1997; IEEE; 10 pages.*
Haldas, Mike, "Recorded Video Search & Playback for iDVR-PRO HD CCTV DVRs", http://web.archive.org/web/20150323084214/http://www.cctvcamerapros.com/CCTV-DVR-Video-Search-Playback-s/832.htm, Published on: Mar. 23, 2015, 11 pages.

* cited by examiner

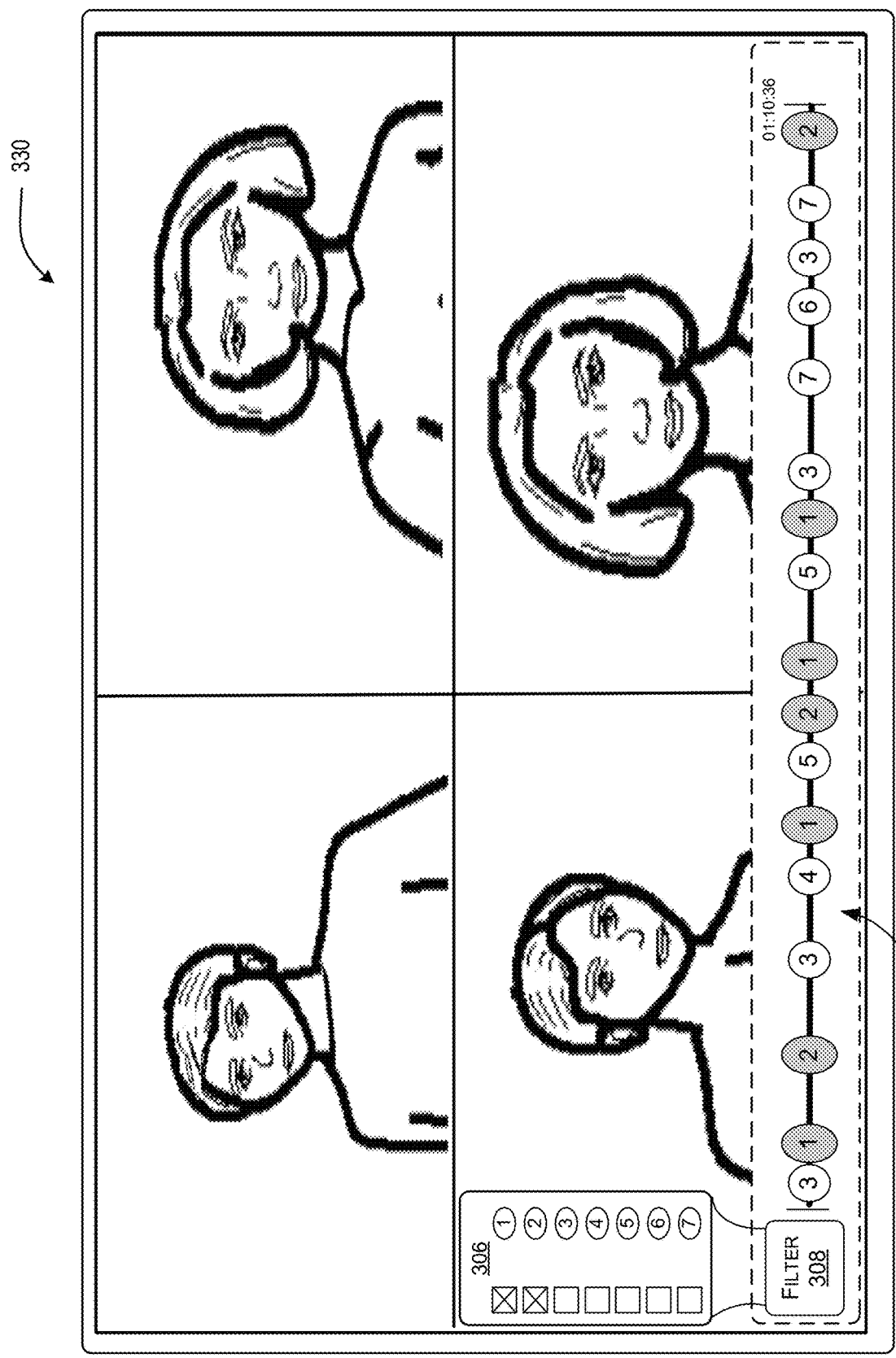

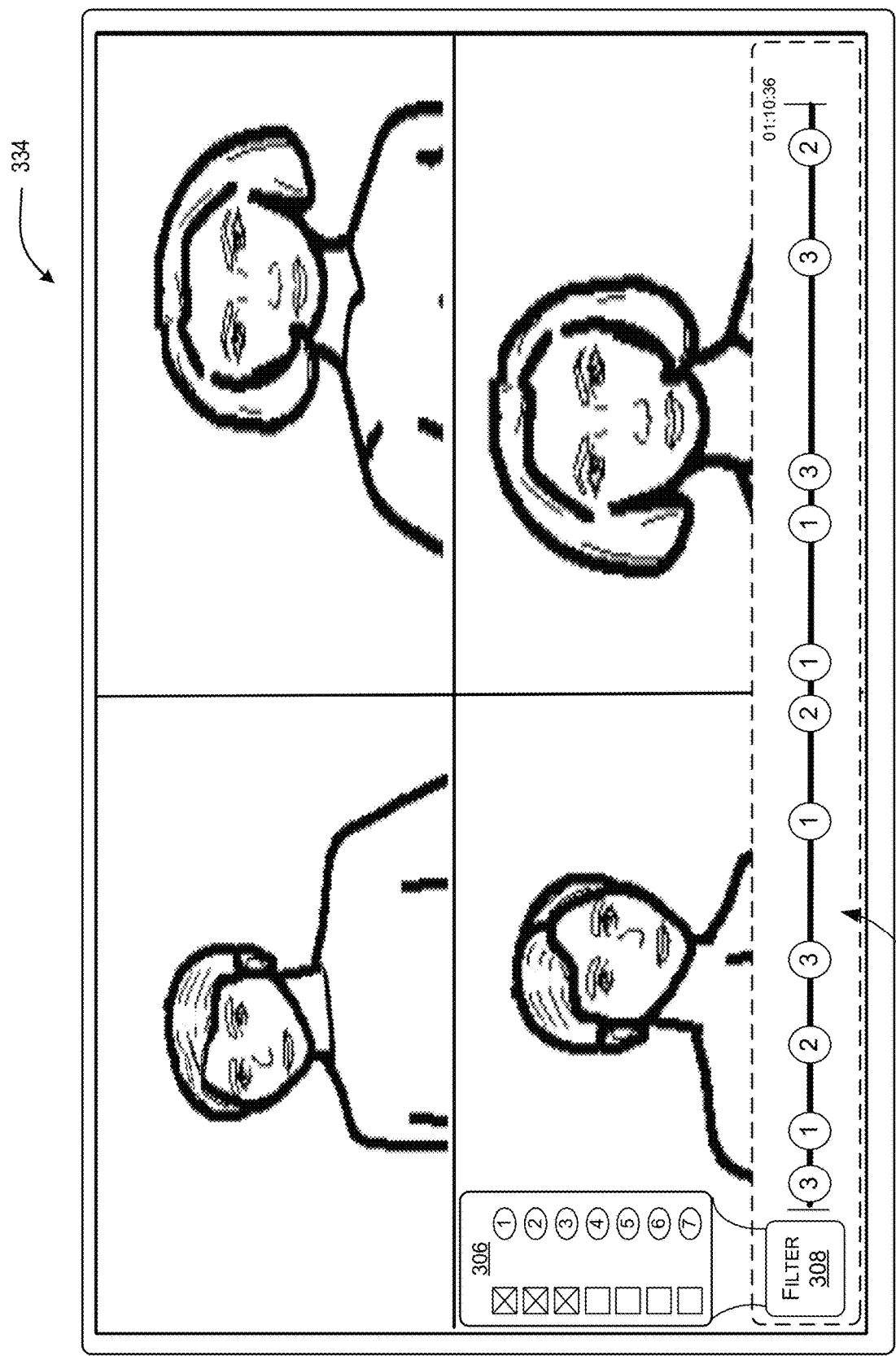

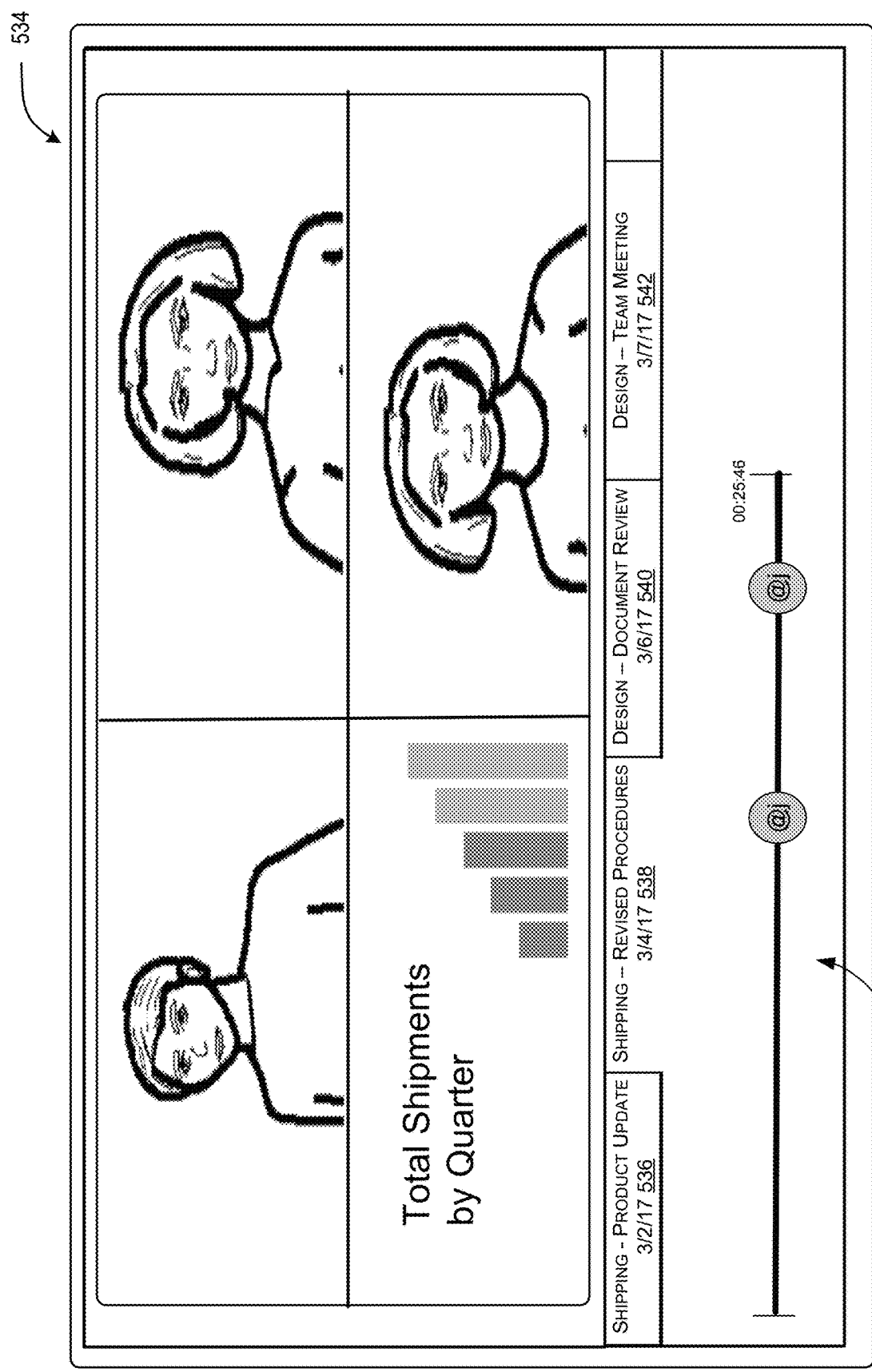

INTERACTIVE TIMELINE THAT DISPLAYS REPRESENTATIONS OF NOTABLE EVENTS BASED ON A FILTER OR A SEARCH

BACKGROUND

At present, the use of teleconference (e.g., videoconference) systems in personal and commercial settings has increased dramatically so that meetings between people in remote locations can be facilitated. In general, teleconference systems allow users, in two or more remote locations, to communicate interactively with each other via live, simultaneous two-way video streams, audio streams, or both. Some teleconference systems (e.g., CISCO WEBEX provided by CISCO SYSTEMS, Inc. of San Jose, Calif., GOTOMEETING provided by CITRIX SYSTEMS, INC. of Santa Clara, Calif., ZOOM provided by ZOOM VIDEO COMMUNICATIONS of San Jose, Calif., GOOGLE HANGOUTS by ALPHABET INC. of Mountain View, Calif., and SKYPE FOR BUSINESS provided by the MICROSOFT CORPORATION, of Redmond, Wash.) also allow users to exchange files and/or share display screens that present, for example, images, text, video, applications, online locations, social media, and any others.

Teleconference systems enable a user to participate in a teleconference session (e.g., a meeting) via a remote device. In some scenarios, the user may have missed a live viewing of a teleconference session due to a scheduling conflict, for example (e.g., a two-week vacation, a late lunch, another scheduled meeting at the same time, etc.). In additional scenarios, the user may have missed a live viewing of a teleconference session due to being located in a different time zone, and thus, being on a different schedule (e.g., work day schedule, sleep schedule, etc.). In these types of scenarios, if the user wants to know what previously occurred in the teleconference session, the user typically needs to navigate (e.g., fast forward and/or rewind) a full recording of the teleconference session to try to find the relevant activity that previously occurred. Furthermore, in these types of scenarios, the user is unable to quickly locate events that occur in a teleconference session that the user may desire to view.

SUMMARY

The disclosed system addresses the problems described above. Specifically, the disclosed system is configured to enable a user to filter notable events, representations for which are presented on a timeline. The timeline can be associated with a teleconference session and/or a collaboration environment. The filtering can be implemented based on a type of a notable event. For instance, a type of a notable event can include an "@mention" of any user or a shared file in any format, as further described herein along with other types of notable events. The filtering can also or alternatively be more refined such that it can be implemented based on a specific notable event. That is, a specific notable event can include defined characteristics that further filter or limit the broader type of notable event to a sub-type. For instance, a specific notable event can include an "@mention" (e.g., a broader type of notable event) of a specific user such as "Jane" (e.g., the sub-type of the "@mention" type of notable event). Moreover, a specific notable event can include a shared file (e.g., a broader type of notable event) with a specific format such as "doc" and/or a specific name such as "Example File Name" (e.g., the sub-type of the shared file type of notable event). Other examples of specific notable events are described herein. Even further, the filtering can be implemented based on an individual person such that a user can filter notable events to locate and view any activity, regardless of type, associated with the person (e.g., when the person is mentioned, contributions to a teleconference session and/or the timeline by the person, etc.).

The disclosed system is also or alternatively configured to enable a user to search for instances of types of notable events, instances of specific notable events, and/or activity associated with a person. That is, based on a search request submitted by the user, the system can search recorded teleconference sessions and/or chat conversations maintained in a data store to locate the instances of the types of notable events and/or the instances of the specific notable events. The data store can be associated with a collaboration environment of a team or a group of users that is configured to track and timestamp activity that occurs within the collaboration environment. The collaboration environment can comprise, or be part of, an application or suite of applications that provides various collaboration tools such as teleconferencing, chat communications, document upload and storage for sharing and reviewing purposes, and so forth.

In various examples, the system is configured to provide results to the search request that list the recorded teleconference sessions and/or chat conversations that include at least one instance of a type of notable event and/or a specific notable event. The user can then select a recorded teleconference session and/or a chat conversation from the results listed and view a timeline associated with the recorded teleconference session and/or chat conversation selected to view representations of the type of notable event and/or the specific notable event. In alternative examples, the system is configured to generate and display a timeline based on a time period defined in the search request, the timeline including representations of the instances of the types of notable events and/or the instances of specific notable events that are part of the search request.

Consequently, the system described herein provides a tool that enables a user to efficiently and effectively locate and/or view activity that is desirable (e.g., activity the user wants or prefers to view). That is, the system can configure a timeline to accentuate (e.g., bring focus to, promote, etc.) desirable activity by either removing other activity that is not desired from the timeline or graphically distinguishing between the desired activity and the undesired activity on the timeline. The system is aware of what is desired based on filter requests and/or search requests submitted based on user input.

As described with respect to examples provided herein, the system is configured to generate and display a timeline that includes representations (e.g., markers, symbols, icons, nodes, thumbnails, etc.) of notable events. The timeline can represent a duration of a teleconference session, and thus, each representation of a notable event on the timeline can be associated with a timestamp, or a time period, based on when the notable event occurs within the duration of the teleconference session. Alternatively, the timeline can represent an arbitrary time period that, for example, can be defined by a user so the user can preview important activity that occurs in association with a collaboration environment (e.g., the user can view activity that was missed while the user was on vacation for a week). Furthermore, the timeline is interactive (e.g., referred to herein as an "interactive timeline") such that a user is able to interact with individual representations on the timeline to quickly access and view information associated with an individual notable event. In various examples, a teleconference session can comprise content that was recorded, or is being recorded, during a live viewing of the teleconference session. Thus, a recorded teleconference session can comprise prior activity of user(s) that participated in a live viewing of the teleconference session. The system can add a representation of a notable event to an interactive timeline during the live viewing of a teleconference session. The system can also add a representation of a notable event to the interactive timeline during a recorded viewing of the teleconference session (e.g., a viewing of recorded content after the live viewing has ended). Consequently, users that may have missed the live viewing of the teleconference session can still view the teleconference session and/or contribute activity to the teleconference session experience even after the live viewing of the teleconference session has ended.

A notable event includes activity (e.g., one or more actions) that is considered to be important or relevant to understanding a context of what occurred in a teleconference session and/or in a collaboration environment, such that knowledge of the activity via a quick view of a representation on the interactive timeline and/or via interacting with the representation to view additional information about the notable event enables a user to efficiently gain an awareness of what has occurred. The notable events can be of a variety of different types, and thus, the interactive timeline is configured to present different types of representations that correspond to different types of notable events. The different types of representations presented on the interactive timeline can comprise graphical distinctions (e.g., different symbols, different icons, different colors, different sizes, etc.).

In various examples, different types of notable events can include: a mention of a user (e.g., an "@mention", a name, etc.), a mention of a team or a group, a file or a display screen that is shared (e.g., a document, a presentation, a spreadsheet, a video, a web page, etc.), a comment that is submitted to a chat conversation, a task that is assigned, a poll that is conducted, an expression (e.g., an emoji) that is shared, or a link to an external object such as a teleconference session (e.g., a link to a newly scheduled meeting while a current meeting is being conducted). Other types of notable events can include: a user joining a teleconference session, a user leaving a teleconference session, media (e.g., video) injected into a recording of the teleconference session after the teleconference session has ended, an explicit flag or meta tag added to the interactive timeline by a user to mark an important moment, a time period of concentrated activity, recognition that a particular voice begins to speak, or any other activity determined to provide value or contribute to understanding a context of a teleconference session or a collaboration environment. In various examples, the system can detect an occurrence of a notable event in a chat conversation conducted in accordance with a teleconference session, and can add a corresponding representation to the interactive timeline based on the detection. This enables users to submit comments, replies to comments, files, expressions (e.g., emojis), links to external objects (e.g., a URL), etc. to the chat conversation while viewing live or recorded content of a teleconference session and those comments, replies to comments, files, expressions, links to external objects, etc. can be timestamped and added to the interactive timeline at a point where an interactive timeline cursor is currently located (e.g., a current point of playback). Consequently, viewers of live or recorded content of a teleconference session can collaboratively contribute notable events to the interactive timeline using the chat conversation.

In various examples described herein, the system causes an interactive timeline associated with a teleconference session to be displayed and receives a request to filter the representations displayed on the interactive timeline. To filter the representations, the user can provide input that defines types of notable events that are desirable and/or specific notable events that are desirable. Stated another way, the user can provide input to define filter settings. For example, the system can display visual elements (e.g., an options menu) that allows a user to select and/or de-select, as filter settings, a type of notable event and/or a specific notable event for filtering purposes, and the request to filter can be generated based on the visual elements that are selected and/or de-selected. Using the request to filter, the system can update the displayed interactive timeline to graphically accentuate the representations that the user desires to view or locate based on the filter settings. In one example, the system can graphically accentuate the desired representations by removing the undesired representations from the interactive timeline. In other examples, the system can graphically accentuate the desired representations by graphically distinguishing the desired representations from the undesired representations on the interactive timeline (e.g., graphically distinguish by color, graphically distinguish by size, graphically distinguish by brightness or highlighting, etc.). By accentuating (e.g., bring focus to, promoting, surfacing, etc.) the desired representations, the user can quickly be directed to the types of notable events and/or the specific notable events that the user desires to view or locate.

In additional examples described herein, the system can receive a request to search a collaboration environment (e.g., recorded teleconference sessions, chat conversations, etc.) for a type of notable event or for a specific notable event. As described above, a specific notable event can include defined characteristics that further limit a broader "type" search into a sub-type. For example, a user can search for "@Jane shares a filed named 'Example File Name'". In response to receiving the search request, the system searches for instances of the type of notable event and/or instances of the specific notable event and provides results to the search request. The results can list recorded teleconference sessions and/or chat conversations that individually include the instances of the type of notable event and/or the instance of the specific notable event. Upon receiving such results, a user can select a recorded teleconference session and/or a chat conversation from the list and an associated interactive timeline can be displayed with a representation of the specific notable event.

Alternatively, the results can comprise a general timeline (e.g., a timeline that represents a real-world time period), limits for which are established based on a time period defined in the search request. The general timeline can include representations of the instances of the types of notable events and/or the instances of the specific notable events that are searched for (e.g., as they occur across multiple teleconference sessions, chat conversations, and other collaboration tools). As described above, the system can graphically accentuate the desired activity by removing the undesired activity that was not searched for from the interactive timeline. In other examples, the system can graphically accentuate the desired activity by graphically distinguishing the desired activity from the undesired activity on the interactive timeline (e.g., graphically distinguish by color, graphically distinguish by size, graphically distinguish by brightness or highlighting, etc.).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3C illustrates another example graphical user interface configured to display visual elements that enable a user to define filter settings based on a type of notable event so that desirable activity is graphically accentuated on an interactive timeline.

FIG. 3D illustrates yet another example graphical user interface configured to display visual elements that enable a user to define filter settings based on a type of notable event so that desirable activity is graphically accentuated on an interactive timeline.

FIG. 5C illustrates another example graphical user interface displaying a configuration in which results of the search can be accessed and viewed.

DETAILED DESCRIPTION

Examples described herein provide a system that enables a user to filter notable events, representations for which are presented on a timeline associated with a teleconference session or a collaboration environment. The filtering can be implemented based on a type of a notable event. The filtering can also or alternatively be more refined such that it can be implemented based on a specific notable event (e.g., defined characteristics that further limit the broader type of notable event to a sub-type). The system is also or alternatively configured to enable a user to search for instances of types of events and/or instances of specific notable events. For instance, based on a search request submitted by the user, the system can search recordings of teleconference sessions and/or stored chat conversations maintained in a data store to locate the instances of the types of notable events and/or the instances of the specific notable event. The system is configured to provide results to the search request that list the teleconference sessions and/or chat conversations that include the located instances. The user can then select a teleconference session and/or a chat conversation from the results listed and view an interactive timeline associated with the teleconference session and/or chat conversation selected to view representations of the instances of the types of notable events and/or the instances of the specific notable events for which a search request is submitted. Consequently, the system described herein provides a tool that enables a user to efficiently and effectively locate activity that is desirable for viewing purposes (e.g., activity the user wants or prefers to view or locate).

Various examples, implementations, scenarios, and aspects are described below with reference to FIGS. 1 through 9.

Figure 1:
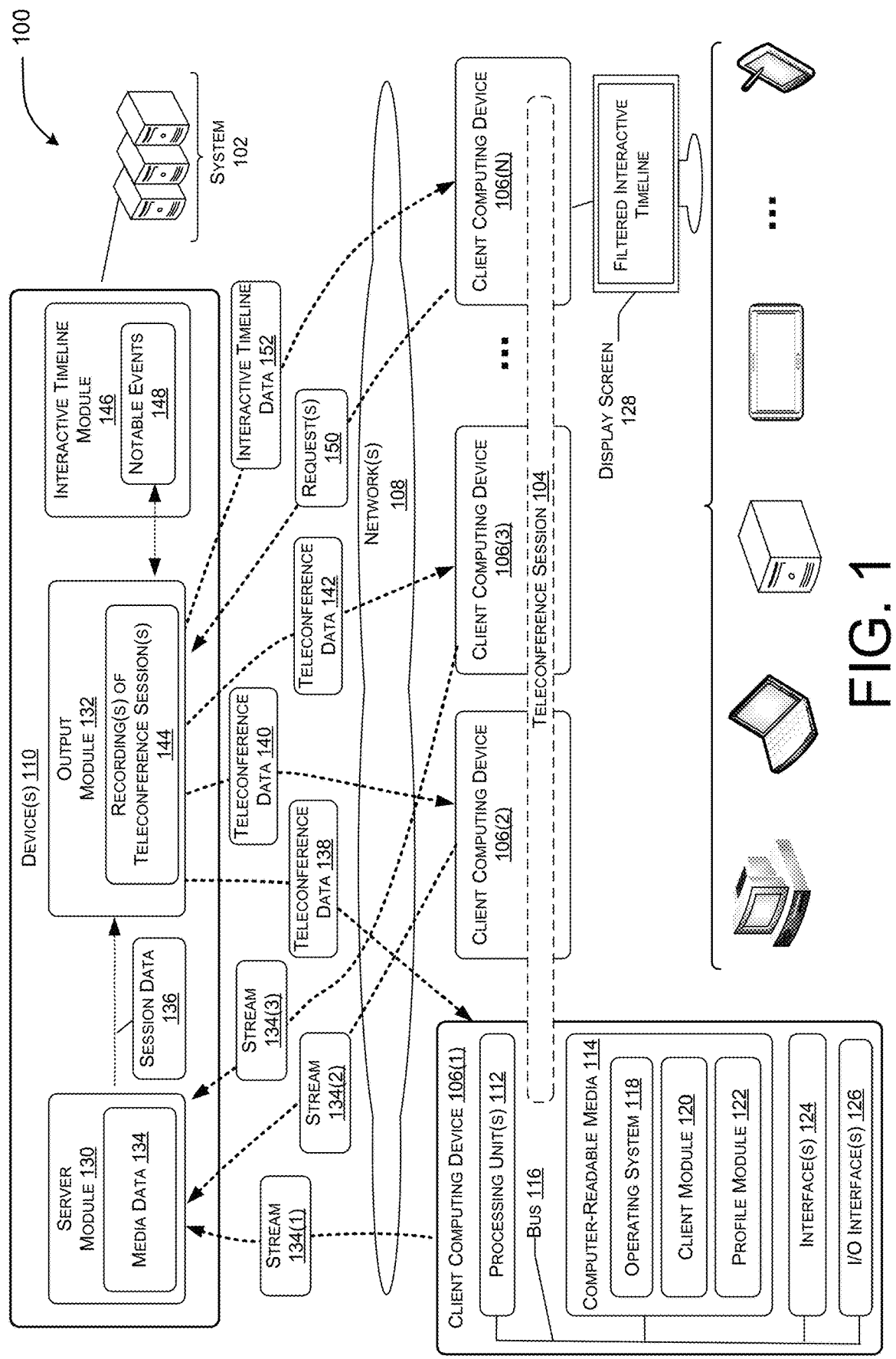
FIG. 1 is a diagram illustrating an example environment in which a system can cause representations of notable events to be displayed on an interactive timeline based on a filter request and/or a search request.

FIG. 1 is a diagram illustrating an example environment 100 in which a system 102 can operate to cause representations of notable events to be displayed on an interactive timeline based on a filter request and/or a search request. The interactive timeline can be associated with a teleconference session 104. In this example, the teleconference session 104 is implemented between a number of client computing devices 106(1) through 106(N) (where N is a positive integer number having a value of two or greater). The client computing devices 106(1) through 106(N) enable users to participate in the teleconference session 104. In this example, the teleconference session 104 is hosted, over one or more network(s) 108, by the system 102. That is, the system 102 can provide a service that enables users of the client computing devices 106(1) through 106(N) to participate in the teleconference session 104 (e.g., via a live viewing and/or a recorded viewing). Consequently, a "participant" to the teleconference session 104 can comprise a user and/or a client computing device (e.g., multiple users may be in a conference room participating in a teleconference session via the use of a single client computing device), each of which can communicate with other participants. As an alternative, the teleconference session 104 can be hosted by one of the client computing devices 106(1) through 106(N) utilizing peer-to-peer technologies. The system 102 can also host chat conversations and other team collaboration functionality (e.g., as part of an application suite). In one example, a chat conversation can be conducted in accordance with the teleconference session 104.

In examples described herein, client computing devices 106(1) through 106(N) participating in the teleconference session 104 are configured to receive and render for display, on a user interface of a display screen, teleconference data. The teleconference data can comprise a collection of various instances, or streams, of live content. For example, an individual stream of live content can comprise media data associated with a video feed (e.g., audio and visual data that capture the appearance and speech of a user participating in the teleconference session). Another example of an individual stream of live content can comprise media data that includes an avatar of a user participating in the teleconference session along with audio data that captures the speech of the user. Yet another example of an individual stream of live content can comprise media data that includes a file displayed on a display screen along with audio data that captures the speech of a user. Accordingly, the various streams of live content within the teleconference data enable a remote meeting to be facilitated between a group of people and the sharing of content within the group of people. The teleconference data can additionally or alternatively comprise recorded content. The recorded content can be requested for viewing by a client computing device.

The system 102 includes device(s) 110. The device(s) 110 and/or other components of the system 102 can include distributed computing resources that communicate with one another and/or with the client computing devices 106(1) through 106(N) via the one or more network(s) 108. In some examples, the system 102 may be an independent system that is tasked with managing aspects of one or more teleconference sessions such as teleconference session 104. As an example, the system 102 may be managed by entities such as SLACK, WEBEX, GOTOMEETING, GOOGLE HANGOUTS, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorders ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 118, a client module 120, a profile module 122, and other modules, programs, or applications that are loadable and executable by processing units(s) 112.

Client computing device(s) 106(1) through 106(N) may also include one or more interface(s) 124 to enable communications between client computing device(s) 106(1) through 106(N) and other networked devices, such as device(s) 110, over network(s) 108. Such network interface(s) 124 may include one or more network interface controllers (NICs) or other types of transceiver devices to send and receive communications and/or data over a network. Moreover, client computing device(s) 106(1) through 106(N) can include input/output ("I/O") interfaces 126 that enable communications with input/output devices such as user input devices including peripheral input devices (e.g., a game controller, a keyboard, a mouse, a pen, a voice input device such as a microphone, a touch input device, a gestural input device, and the like) and/or output devices including peripheral output devices (e.g., a display, a printer, audio speakers, a haptic output device, and the like). FIG. 1 illustrates that client computing device 106(N) is in some way connected to a display device (e.g., a display screen 128), which can display a filtered interactive timeline, as shown.

In the example environment 100 of FIG. 1, client computing devices 106(1) through 106(N) may use their respective client modules 120 to connect with one another and/or other external device(s) in order to participate in the teleconference session 104, or in order to contribute activity to a collaboration environment. For instance, a first user may utilize a client computing device 106(1) to communicate with a second user of another client computing device 106(2). When executing client modules 120, the users may share data, which may cause the client computing device 106(1) to connect to the system 102 and/or the other client computing devices 106(2) through 106(N) over the network(s) 108.

The client computing device(s) 106(1) through 106(N) may use their respective profile module 122 to generate participant profiles, and provide the participant profiles to other client computing devices and/or to the device(s) 110 of the system 102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for teleconference sessions.

As shown in FIG. 1, the device(s) 110 of the system 102 includes a server module 130 and an output module 132. In this example, the server module 130 is configured to receive, from individual client computing devices such as client computing devices 106(1) through 106(3), media streams 134(1) through 134(3). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 130 is configured to receive a collection of various media streams 134(1) through 134(3) during a live viewing of the teleconferenced session 104 (the collection being referred to herein as media data 134). In some scenarios, not all the client computing devices that participate in the teleconference session 104 provide a media stream. For example, a client computing device may only be a consuming, or a "listening", device such that it only receives content associated with the teleconference session 104 but does not provide any content to the teleconference session 104.

In various examples, the server module 130 can select aspects of the media data 134 that are to be shared with individual ones of the participating client computing devices 106(1) through 106(N). Consequently, the server module 130 is configured to pass the session data 136 to the output module 132 and the output module 132 may communicate teleconference data to the client computing devices (e.g., client computing devices 106(1) through 106(3) participating in a live viewing of the teleconference session). As shown, the output module 132 transmits teleconference data 138 to client computing device 106(1), and transmits teleconference data 140 to client computing device 106(2), and transmits teleconference data 142 to client computing device 106(3). The teleconference data transmitted to the client computing devices can be the same or can be different (e.g., positioning of streams of content within a user interface may vary from one device to the next). The output module 132 is also configured to record teleconference sessions (e.g., one or more versions of the teleconference data) and to maintain recordings of teleconference sessions 144.

The device(s) 110 can also include an interactive timeline module 146, and in various examples, the interactive timeline module 146 is configured to determine notable events 148 in the session data 136 and/or notable events added to the recording of the teleconference session 144. For instance, a notable event 148 can occur as a live viewing of the teleconference session 104 is initially being conducted and/or recorded such that activity that amounts to notable events by users of client computing devices 106(1) through 106(3) that are participating via the live viewing can be determined and added to an interactive timeline by the interactive timeline module 146. A notable event 148 can also occur in association with a recorded viewing of the recording of the teleconference session 144.

In various examples, the interactive timeline module 146 is configured to examine a transcript of a teleconference session to detect notable events 148. The transcript can be generated based on one or more of spoken dialogue during the teleconference session, comments submitted to a chat conversation conducted in accordance with the teleconference session, content of files shared during a teleconference session (e.g., text of a document), etc.

As described above, example types of notable events 148 can include: a mention of a user (e.g., an "@mention"), a mention of a team, a file or a display screen that is shared (e.g., a document, a presentation, a spreadsheet, a video, a web page, etc.), a comment that is submitted to a chat conversation, a task that is assigned, a poll that is conducted, an expression (e.g., an emoji) that is shared, a link to an external object such as a teleconference session (e.g., a link to a newly scheduled meeting while a current meeting is being conducted), a user joining the teleconference session, a user leaving the teleconference session, an explicit flag or tag that is added to the interactive timeline by a user to mark an important moment, a time period of concentrated activity, or any other activity determined to provide value or contribute to understanding a context of a teleconference session or a collaboration environment.

A client computing device such as client computing device 106(N) can provide a request 150 to view desirable activity. As described above, in one implementation, the request 150 can be a request to filter an interactive timeline that is already being displayed, or is to be displayed, in association with live or recorded content. For instance, client computing device 106(N) can be a participant in the live teleconference session 104 or can view a recording of the teleconference session 104 after the teleconference session has ended. The request to filter can include filter settings defined based on user input. Examples of user input to define filter settings is further described herein with respect to FIGS. 3A-3F. In another implementation, the request 150 can be a search request that includes data based on user input (e.g., information entered into one or more search fields). Examples of user input to generate a search request is further described herein with respect to FIGS. 4A-4B and 5A.

In response to receiving a request, the output module 132 can provide interactive timeline data 152 to be displayed on a display screen 128 associated with the client computing device 106(N). The interactive timeline data 152 can comprise an interactive timeline, or an update to an interactive timeline, that accentuates representations of notable events a user desires to view and locate (e.g., based on the filter settings and/or the input to the search fields).

Figure 2:
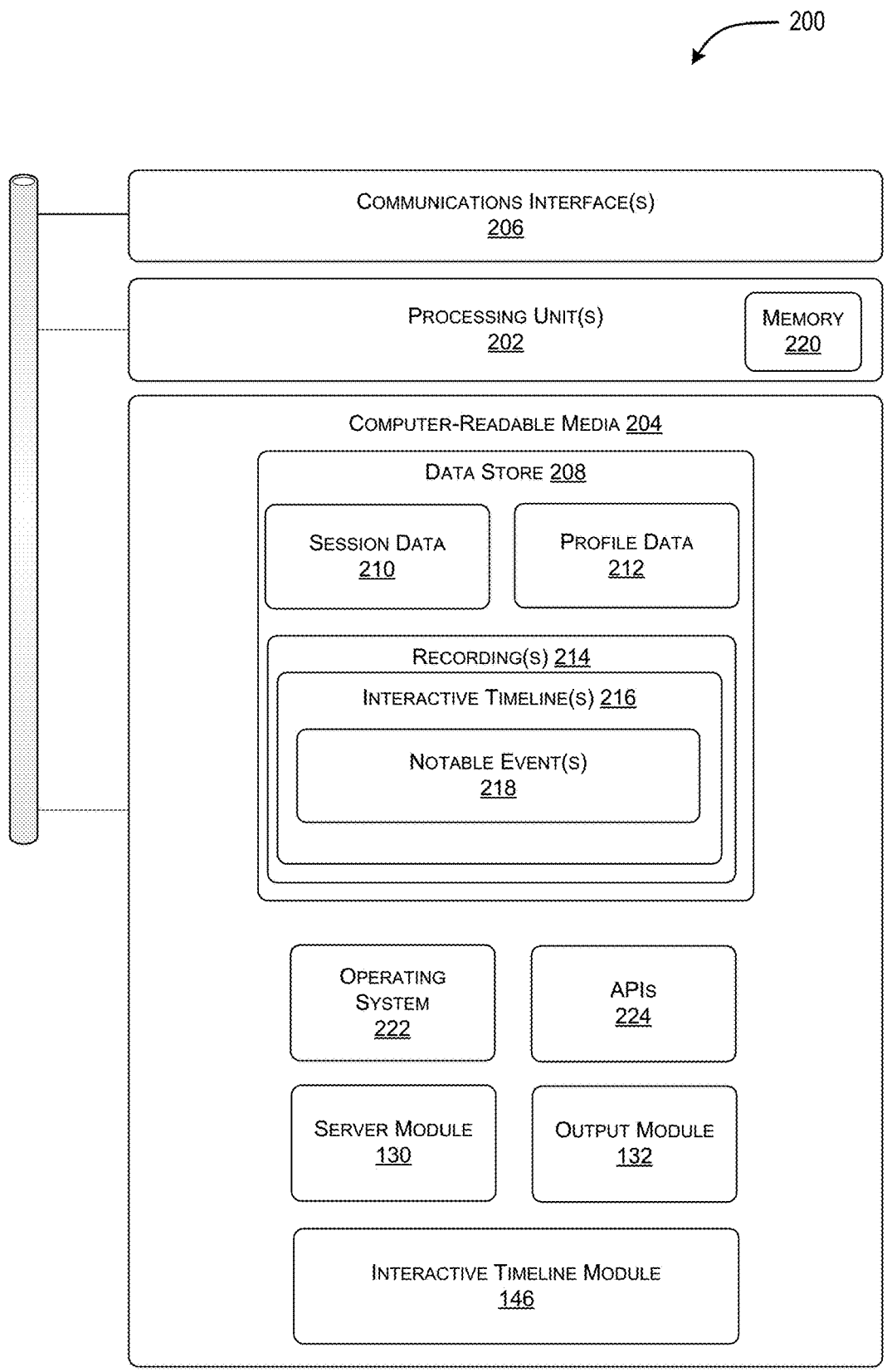
FIG. 2 is a diagram illustrating example components of an example device configured to cause representations of notable events to be displayed on an interactive timeline based on a filter request and/or a search request.

FIG. 2 illustrates a diagram that shows example components of an example device 200 configured to cause representations of notable events to be displayed on an interactive timeline based on a filter request and/or a search request. The device 200 may represent one of device(s) 110, or in other examples a client computing device, where the device 200 includes one or more processing unit(s) 202, computer-readable media 204, and communication interface(s) 206. The components of the device 200 are operatively connected, for example, via a bus, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network.

In the illustrated example, computer-readable media 204 includes a data store 208. In some examples, data store 208 includes data storage such as a database, data warehouse, or other type of structured or unstructured data storage. In some examples, data store 208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 208 may store data for the operations of processes, applications, components, and/or modules stored in computer-readable media 204 and/or executed by processing unit(s) 202 and/or accelerator(s). For instance, in some examples, data store 208 may store session data 210 (e.g., session data 136), profile data 212 (e.g., associated with a participant profile), and/or other data. The session data 210 can include a total number of participants (e.g., users and/or client computing devices) in a teleconference session, activity that occurs in the teleconference session, and/or other data related to when and how the teleconference session is conducted or hosted. The data store 208 can also include recording(s) 214 and/or transcripts of teleconference session(s), as well as interactive timeline(s) 216 that include representations of notable event(s) 218 that occur in association with the teleconference session(s). In some examples, the data store 208 stores activity (e.g., notable events) that occur in a collaboration environment so that an interactive timeline can be generated to preview the activity for a defined period of time. As described above, the interactive timeline 216 and/or the notable events 218 can be filtered and/or searched to surface activity that is desired, for viewing purposes, by a user.

Alternately, some or all of the above-referenced data can be stored on separate memories 220 on board one or more processing unit(s) 202 such as a memory on board a CPU-type processor, a GPU-type processor, an FPGA-type accelerator, a DSP-type accelerator, and/or another accelerator. In this example, the computer-readable media 204 also includes operating system 222 and application programming interface(s) 224 configured to expose the functionality and the data of the device 200 to other devices. Additionally, the computer-readable media 204 includes one or more modules such as the server module 130, the output module 132, and the interactive timeline module 146, although the number of illustrated modules is just an example, and the number may vary higher or lower. That is, functionality described herein in association with the illustrated modules may be performed by a fewer number of modules or a larger number of modules on one device or spread across multiple devices.

Figure 3A:
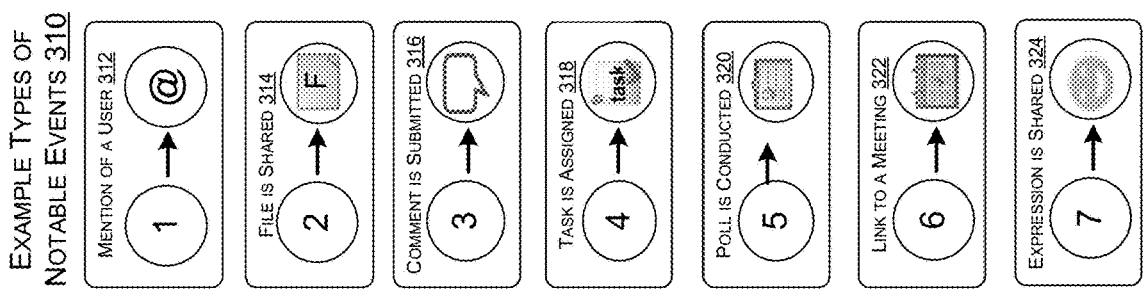
FIG. 3A illustrates an example graphical user interface configured to display an interactive timeline in association with live or recorded content and visual elements that enable a user to define filter settings upon selection of a filter option.
Figure 3A:
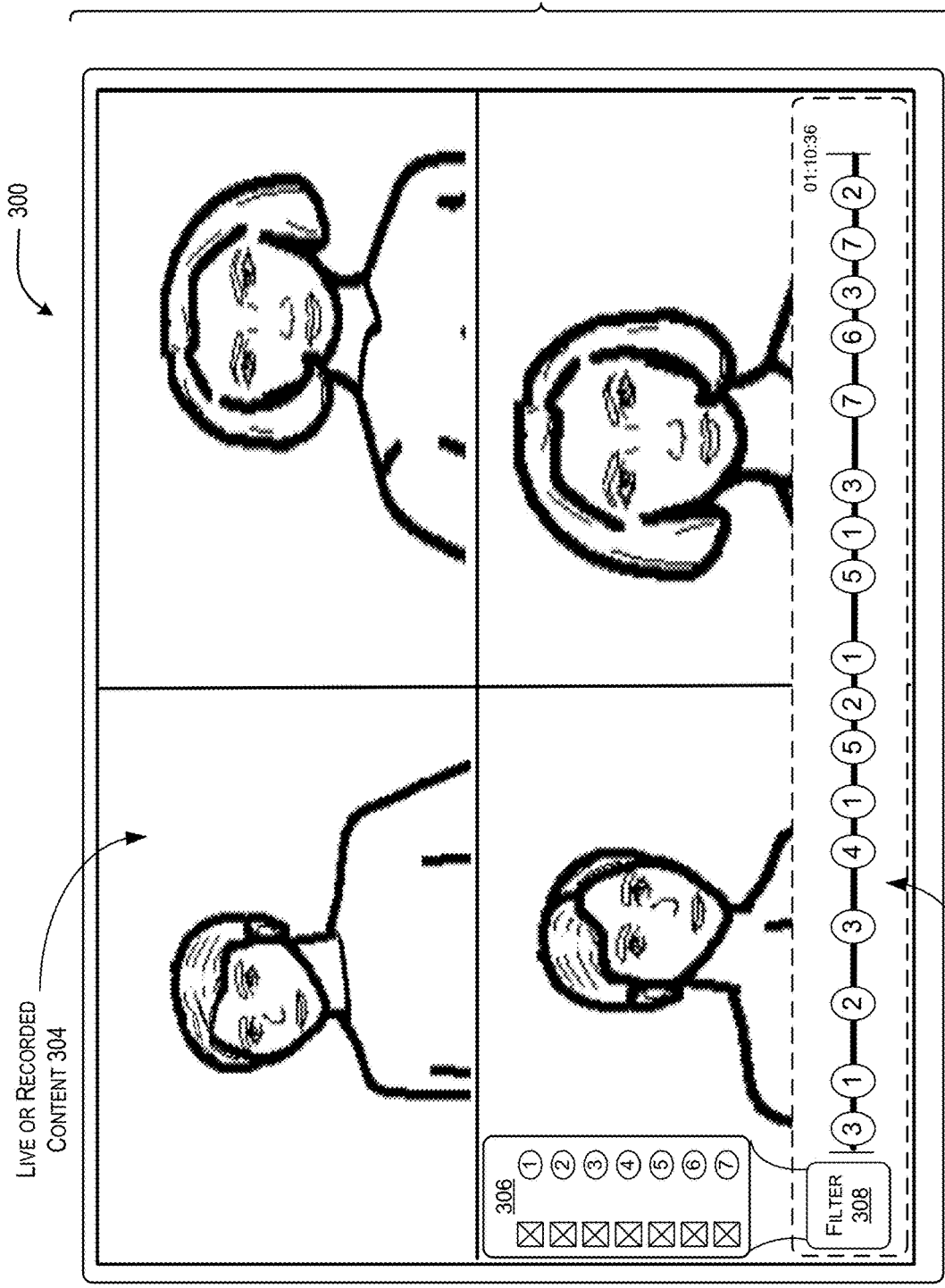

FIG. 3A illustrates an example graphical user interface 300 configured to display an interactive timeline 302 in association with live or recorded content 304 and visual elements 306 that enable a user to define filter settings upon selection of a filter option 308. In this example, the filter settings are defined based on a selection or a de-selection of a visual element (e.g., check or un-check a box that corresponds to a type of a notable event).

As described above, the interactive timeline module 146 is configured to determine when notable events 148 occur within a teleconference session 104, or more generally, within a collaboration environment. The interactive timeline module 146 can then generate the interactive timeline 302 to include representations of the notable events 148 (e.g., populate the interactive timeline with representations). For instance, the interactive timeline module 146 can analyze session data and/or examine a transcript to detect when a notable event occurs (e.g., a user says a name, a user submits a comment to a chat conversation, etc.) or to identify when a user has specifically added a representation of a notable event to the interactive timeline 302. In the example of FIG. 3A, the interactive timeline 302 is displayed at the bottom of the user interface 300 that is presented on a display screen (e.g., display screen 128), and a display area that includes the interactive timeline 302 is not transparent. However, in alternative examples, the display area that includes the interactive timeline 302 can be an overlay display area that is transparent and the interactive timeline 302 can be positioned in other areas of the user interface 300.

The interactive timeline 302 includes different representations (e.g., the circles, squares, or other shapes on the interactive timeline 302) that correspond to different types of notable events 310. This illustrated example includes representations of a first type (e.g., representations on the interactive timeline 302 with the number "1" therein) that correspond to occurrences of a type of notable event in which a user is mentioned (e.g., an "@" mention). Accordingly, representations on the interactive timeline 302 that correspond to a mention of a user can include an icon or a symbol such as "@", as shown in box 312.

This illustrated example also includes representations of a second type (e.g., representations on the interactive timeline 302 with the number "2" therein) that correspond to occurrences of a type of notable event in which a file is shared. Accordingly, representations on the interactive timeline 302 that correspond to a file being shared can include an icon or a symbol such as that shown in box 314.

This illustrated example also includes representations of a third type (e.g., representations on the interactive timeline 302 with the number "3" therein) that correspond to occurrences of a type of notable event in which a comment is submitted. Accordingly, representations on the interactive timeline 302 that correspond to a comment being submitted can include an icon or a symbol such as that shown in box 316.

This illustrated example also includes representations of a fourth type (e.g., representations on the interactive timeline 302 with the number "4" therein) that correspond to occurrences of a type of notable event in which a task is assigned. Accordingly, representations on the interactive timeline 302 that correspond to a task being assigned can include an icon or a symbol such as that shown in box 318.

This illustrated example also includes representations of a fifth type (e.g., representations on the interactive timeline 302 with the number "5" therein) that correspond to occurrences of a type of notable event in which a poll is conducted. Accordingly, representations on the interactive timeline 302 that correspond to a poll being conducted can include an icon or a symbol such as that shown in box 320.

This illustrated example also includes representations of a sixth type (e.g., representations on the interactive timeline 302 with the number "6" therein) that correspond to occurrences of a type of notable event in which a link to an external object is provided. Accordingly, representations on the interactive timeline 302 that correspond to a link to an external object (e.g., a meeting) can include an icon or a symbol such as that shown in box 322.

This illustrated example also includes representations of a seventh type (e.g., representations on the interactive timeline 302 with the number "7" therein) that correspond to occurrences of a type of notable event in which an expression (e.g., an emoji) is shared. Accordingly, representations on the interactive timeline 302 that correspond to an expression being shared can include an icon or a symbol such as that shown in box 324.

The types of notable events 310 illustrated in FIG. 3A are provided herein as examples for illustrative purposes. Thus, other types of notable events are also contemplated, occurrences of which provide value and contribute to an understanding of a context of what has happened in a teleconference session or in a collaboration environment.

The current view at a point in time captured by FIG. 3A comprises content in which four people (e.g., four separate audio/visual streams) are displayed in quadrants (e.g., four grid cells). A "view" comprises a configuration and/or a layout of content of the teleconference session. Consequently, content of a teleconference session can be displayed in multiple different views. Moreover, an interactive timeline can be displayed in association with various different views of teleconference data.

In various implementations, a representation can comprise and/or be associated with: an icon or a symbol indicative of a type of notable event, a user avatar, and/or initials of a user. Furthermore, a representation can comprise and/or be associated with a still image (e.g., a thumbnail image) that captures activity of a view of the teleconference session at a point in time associated with a position of the representation on the interactive timeline 302. For instance, a thumbnail image associated with a video frame can be displayed in association with a representation (e.g., below the representation, above the representation, etc.). In some examples, the thumbnail image can be persistently displayed. Alternatively, the thumbnail image can be configured to come into view based on user interaction (e.g., hover input) with the representation. Consequently, the interactive timeline 302 can provide the user with a visual preview of the recorded content. The user can scan the interactive timeline 302, the representations, and/or the sequence of images to locate recorded content that may be of interest.

The interactive timeline 302 in FIG. 3A represents a teleconference session with a duration of "01:10:36". Moreover, the interactive timeline 302 includes representations of the various example types of notable events 310 that occur in association with the teleconference session, as described above. In many cases, a number of representations displayed on the interactive timeline 302 can be large, and thus, may prevent a user from quickly locating or pinpointing instances of a type of notable event and/or instances of a specific notable event the user desires or prefers to view or locate. The system described herein is configured to enable the user to select a filter option 308 that causes visual elements 306 to be displayed. The visual elements 306 allow a user to select or de-select types of notable events (e.g., "1", "2", "3", "4", "5", "6", "7" which correspond to the illustrated example types of notable events 310) to be displayed or graphically distinguished on the interactive timeline 302. That is, a selection of a visual element corresponding to a type of notable event comprises a filter setting that indicates the type of notable event is desirable for viewing or locating purposes, while a de-selection of a visual element corresponding to a type of notable event comprises a filter setting that indicates the type of notable event is not desirable for viewing or locating purposes.

In the example of FIG. 3A, upon selection of the filter option 308, the visual elements 306 are all selected (e.g., a default configuration auto checks the boxes) and the user is tasked with de-selecting individual visual elements corresponding to types of notable events that are not desired for viewing purposes. However, in other examples, upon selection of the filter option 308, the visual elements 306 are all initially unselected and the user is tasked with selecting individual visual elements corresponding to types of notable events that are desired for viewing purposes.

Figure 3B:
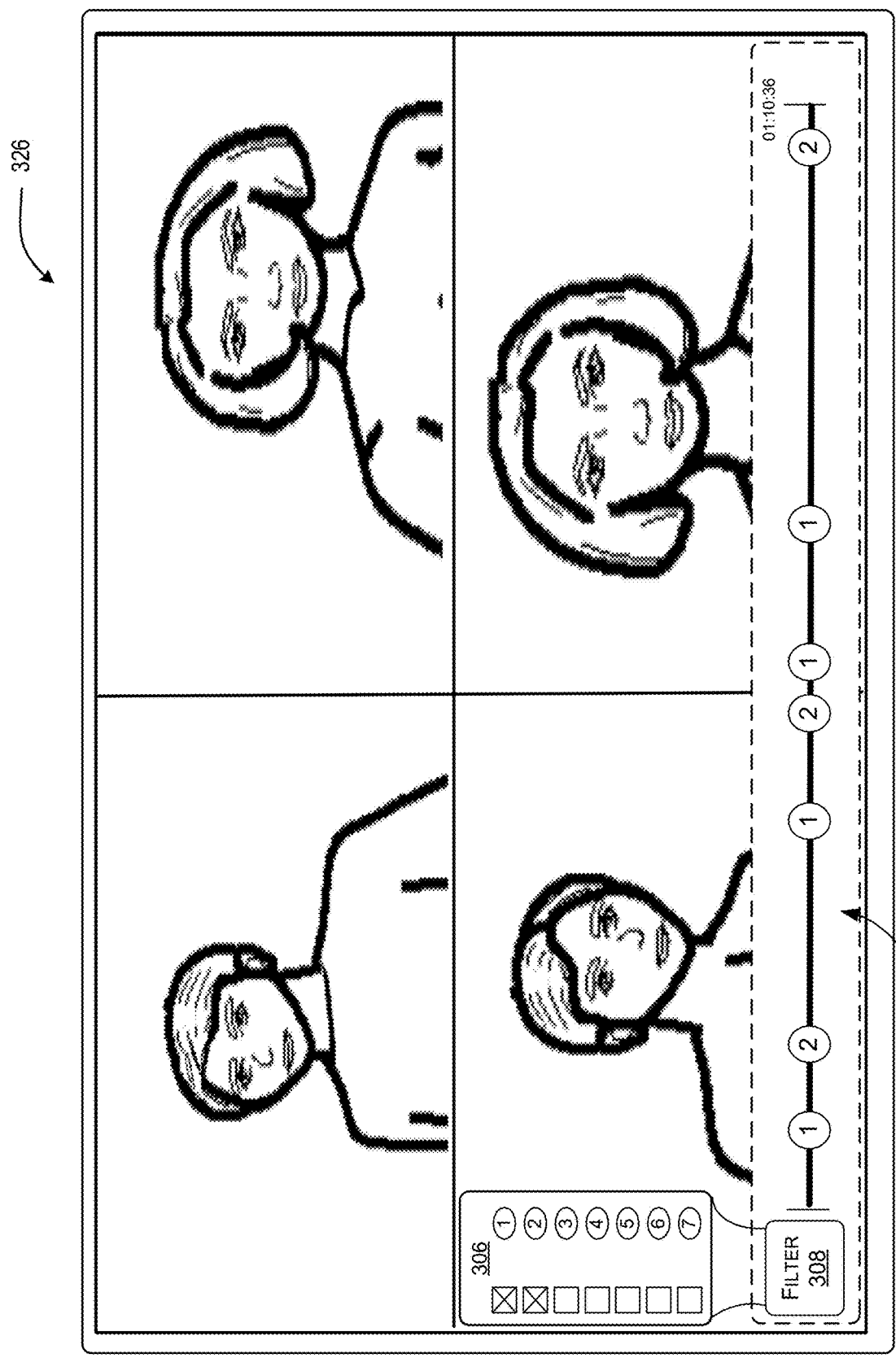
FIG. 3B illustrates an example graphical user interface configured to display visual elements that enable a user to define filter settings based on a type of notable event so that desirable activity is graphically accentuated on an interactive timeline.

FIG. 3B illustrates an example graphical user interface 326 in which a user has de-selected some of the visual elements 306 that were previously selected in FIG. 3A. As described above, by de-selecting the visual elements (e.g., boxes) that correspond to the example type of notable events represented by "3", "4", "5", "6", and "7", the user can define filter settings that provide a basis for a request to filter the interactive timeline 302 illustrated in FIG. 3A. In this example, the filter settings indicate that the example types of notable events represented by "1" and "2" (e.g., a mention of a user 312 and a file being shared 314) are desired for viewing and locating purposes. In contrast, the filter settings indicate that the example type of notable events represented by "3", "4", "5", "6", and "7" (e.g., a comment being submitted 316, a task being assigned 318, a poll being conducted 320, a link to a meeting 322, and an expression being shared 324) are not desired for viewing and locating purposes.

Consequently, the interactive timeline of FIG. 3A is filtered based on the filter request that indicates the filter settings and the interactive timeline 302 from FIG. 3A is updated to include only the representations that correspond to the activity desired to be viewed by the user, as shown by the interactive timeline 328 in FIG. 3B. Stated another way, instances of representations labeled "1" and "2" on the interactive timeline 302 from FIG. 3A are desirable according to the filter settings and therefore remain on the interactive timeline 328 in FIG. 3B, while instances of representations labeled "3", "4", "5", "6", and "7" on the interactive timeline 302 from FIG. 3A are not desirable according to the filter settings and therefore are removed from the interactive timeline 328 in FIG. 3B. Removing instances of representations from the interactive timeline allows the update to the interactive timeline 328 to graphically accentuate the representations that are desired.

FIG. 3C illustrates another example graphical user interface 330 in which a user has de-selected some of the visual elements 306 that were previously selected in FIG. 3A. Similar to FIG. 3B, the filter settings in this example indicate that the example types of notable events represented by "1" and "2" are desired while the example type of notable events represented by "3", "4", "5", "6", and "7" are not desired. Consequently, the interactive timeline of FIG. 3A is filtered based on the filter request that indicates the filter settings and the interactive timeline 302 from FIG. 3A is updated to graphically distinguish between representations that correspond to the activity desired by the user and other representations that correspond to activity that is not desired, as shown by the interactive timeline 332 in FIG. 3C. This enables the interactive timeline 332 to graphically accentuate the representations that correspond to the activity desired by the user. The graphical distinction can comprise one or more of a change in size of a representation, a change in color of a representation, a change in brightness of a representation, etc.

FIG. 3D illustrates an example graphical user interface 334 that captures a scenario in which, after de-selecting a visual element 306 corresponding to "3" (e.g., as shown in FIG. 3B), the user decides that representations of comments being submitted 316 are now desirable for viewing purposes. Thus, by selecting (e.g., re-selecting) the visual element 306 corresponding to "3" in FIG. 3D, the interactive timeline 336 is updated to again include (e.g., add) the representations labeled with a "3".

Figure 3E:
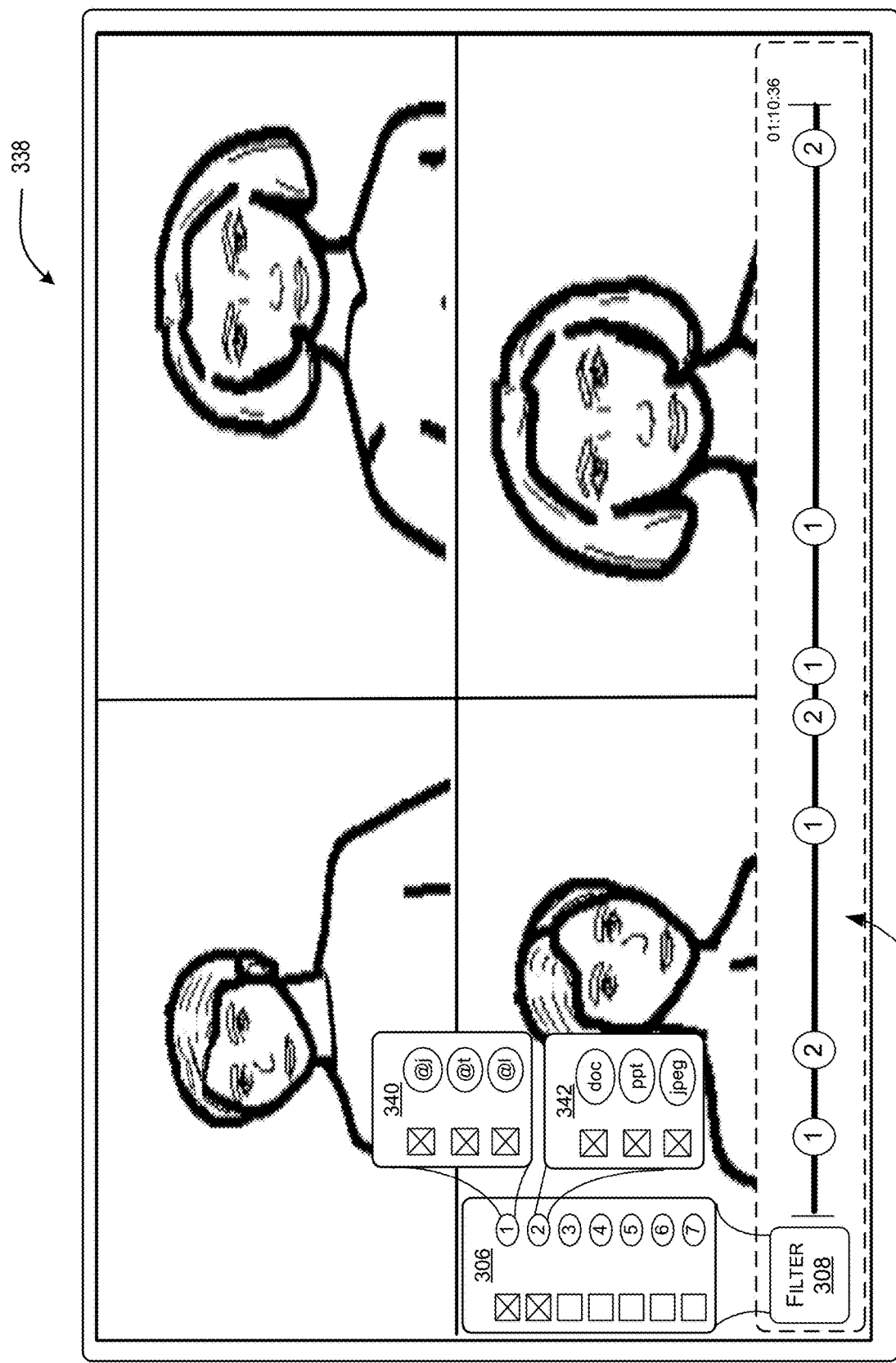
FIG. 3E illustrates an example graphical user interface configured to display visual elements that enable a user to define filter settings based on characteristics of a specific notable event so that desirable activity is graphically accentuated on an interactive timeline.

FIG. 3E illustrates an example graphical user interface 338 configured to display visual elements that enable a user to define filter settings based on characteristics of a specific notable event so that desirable activity is graphically accentuated on an interactive timeline. Similar to FIG. 3B, a user has selected visual elements 306 that correspond to example types "1" and "2", and as a result, the interactive timeline 328 is similar to that shown in FIG. 3B. In the example of FIG. 3E, additional visual elements 340 and 342 are shown. These visual elements 340 and 342 enable a user to further define characteristics of notable events for filtering purposes. As described above, this enables the user to view and quickly locate instances of a specific notable event. Example characteristics that define a sub-type (e.g., a specific notable event) can include text (e.g., a name of a user or a file, a keyword in a comment or a task, a keyword in a title of a poll, an identifier of a specific expression, etc.) or other event properties that distinguish a specific instance of a notable event from another specific instance of a notable event of the same type.

Accordingly, visual elements 340 can correspond to sub-types of a broader "mention of a user 312" type. For example, visual elements 340 can correspond to different users that are mentioned (e.g., "@" is associated with a mention of Jane in a teleconference session, "@t" is associated with a mention of Tim, and "@l" is associated with a mention of Lisa). Visual elements 342 can correspond to sub-types of a broader "file is shared 314" type. That is, visual elements 342 can correspond to different formats of files that are shared (e.g., "doc", "ppt", and "jpeg").

Figure 3F:
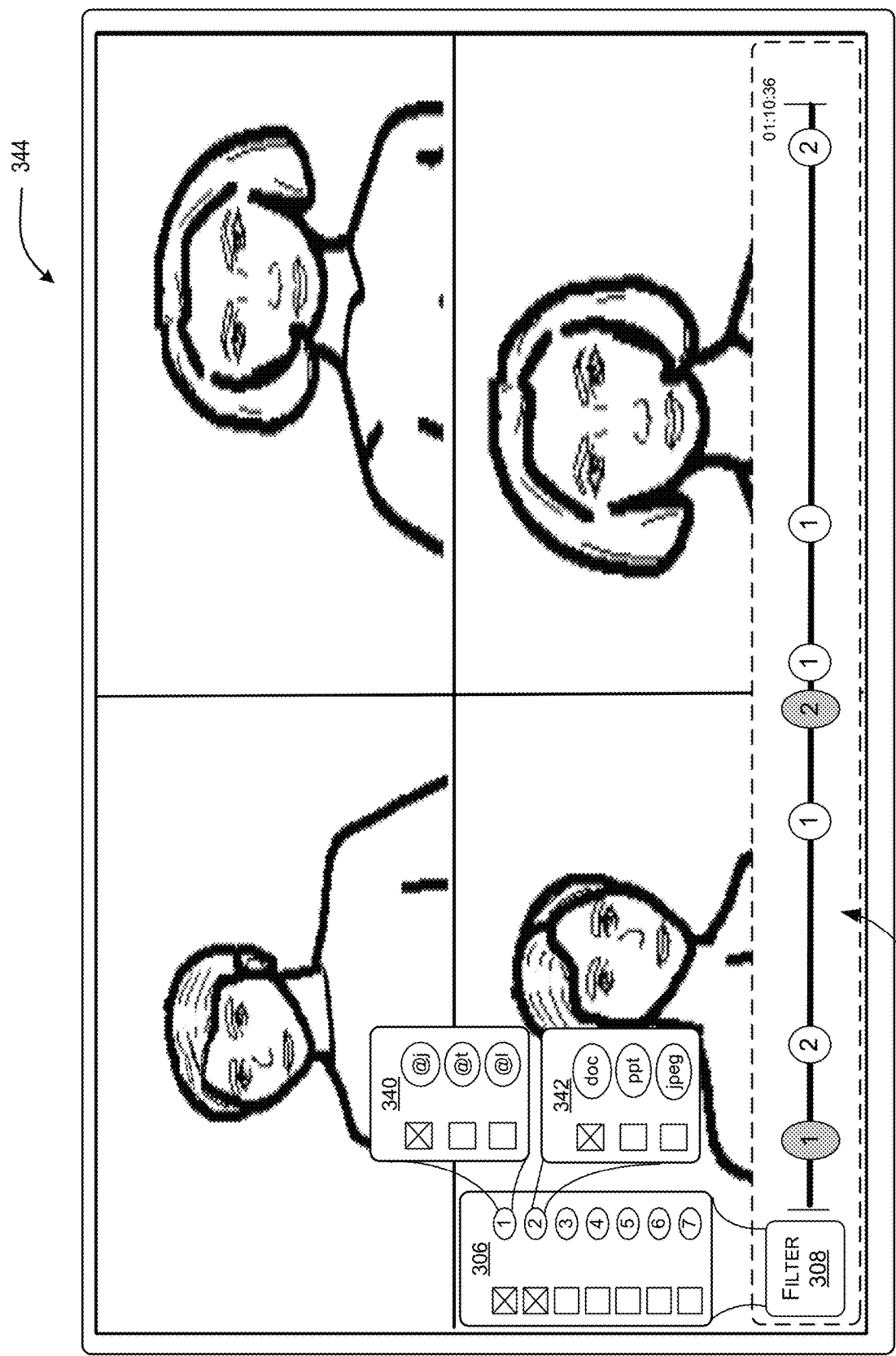
FIG. 3F illustrates another example graphical user interface configured to display visual elements that enable a user to define filter settings based on characteristics of a specific notable event so that desirable activity is graphically accentuated on an interactive timeline.

FIG. 3F illustrates an example graphical user interface 344 in which a user has de-selected some of the visual elements 340 and 342 that were previously selected in FIG. 3E. As shown, the user has de-selected the visual elements 340 associated with "@t" and "@l", as well as the visual elements 342 associated with "ppt" and "jpeg". This indicates the user wants to locate instances where "@" (e.g., "@jane") is mentioned and instances where a "doc" file is shared. Consequently, the interactive timeline 328 of FIG. 3E can be further filtered to graphically accentuate the activity desired, as shown by the graphical distinctions in the interactive timeline 346 in FIG. 3F. That is, the first representation labeled "1" on the left of the interactive timeline 346 is graphically distinguished from the other representations labeled "1" on the interactive timeline 346 because the first representation labeled "1" corresponds to a mention of Jane (e.g., "@jane") while the other representations correspond to a mention of Tim (e.g., "@tim") and/or a mention of Lisa (e.g., "@lisa). Moreover, the second representation labeled "2" in the middle of the interactive timeline 346 is graphically distinguished from the other representations labeled "2" on the interactive timeline 346 because the second representation labeled "2" corresponds to a file of format "doc" being shared while the other representations correspond to a file of format "ppt" and/or a file of format "jpeg" being shared.

The examples of FIGS. 3A-3F illustrate a scenario of how a user can define filter settings for a filter request so that an interactive timeline currently being displayed can be updated in a way that provides an effective visual response (e.g., via graphical accentuation), thereby enabling the user to quickly locate and view desirable occurrences, or instances, of notable events. In various examples, the filtering can be implemented based on types of notable events (e.g., FIGS. 3A-3D). In various examples, the filtering can initially be implemented based on types of notable events (e.g., FIGS. 3A-3D), and then subsequent definition of characteristics that limit the types of notable events to sub-types (e.g., FIGS. 3E and 3F). In other examples, the filtering can be implemented based on definition of characteristics that limit the types of notable events to sub-types without having to initially select or de-select the visual elements 306 corresponding to the broader types.

Figure 4A:
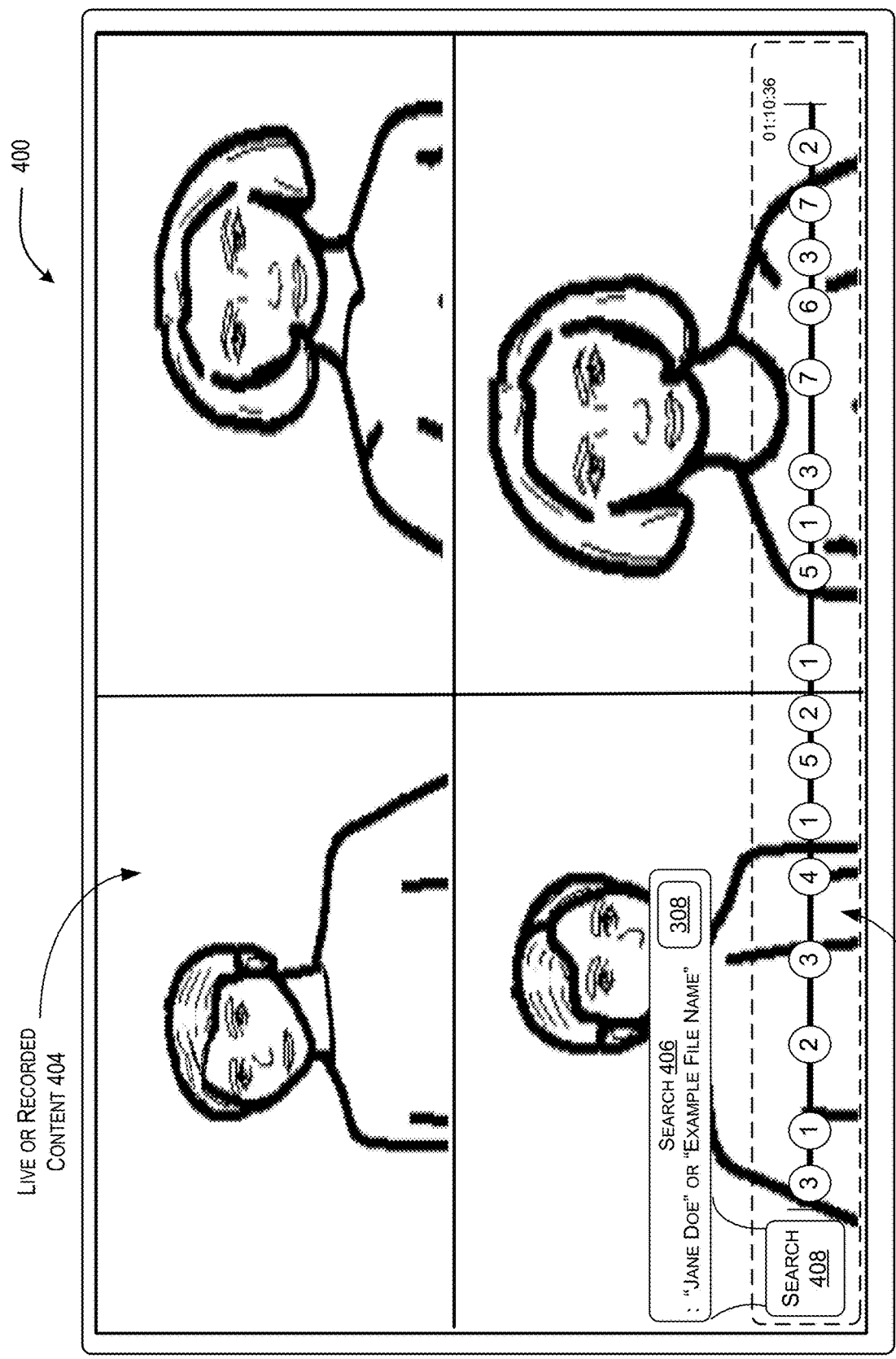
FIG. 4A illustrates an example graphical user interface configured to display an interactive timeline in association with live or recorded content and a search field that enables a user to enter search input based on selection of a search option.

FIG. 4A illustrates an example graphical user interface 400 configured to display an interactive timeline 402 in association with live or recorded content 404 and a search field 406 that enables a user to enter search input based on selection of a search option 408. The interactive timeline 402 in this example is the same as the interactive timeline 302 generated by the interactive timeline module 146 in FIG. 3A. However, in this example, rather than select or de-select visual elements, the user enters text into the search field 406. The text entered can provide a basis for a search request. For example, the user can enter "Jane Doe" or "Example File Name", as illustrated, or even "Jane Doe shares Example File Name".

In various examples, the filter option 308 can be associated with the search 406, such that if the user does not want to enter text for a search then the user can select the filter option 308 and be presented with visual elements, as described above with respect to FIGS. 3A-3F.

Figure 4B:
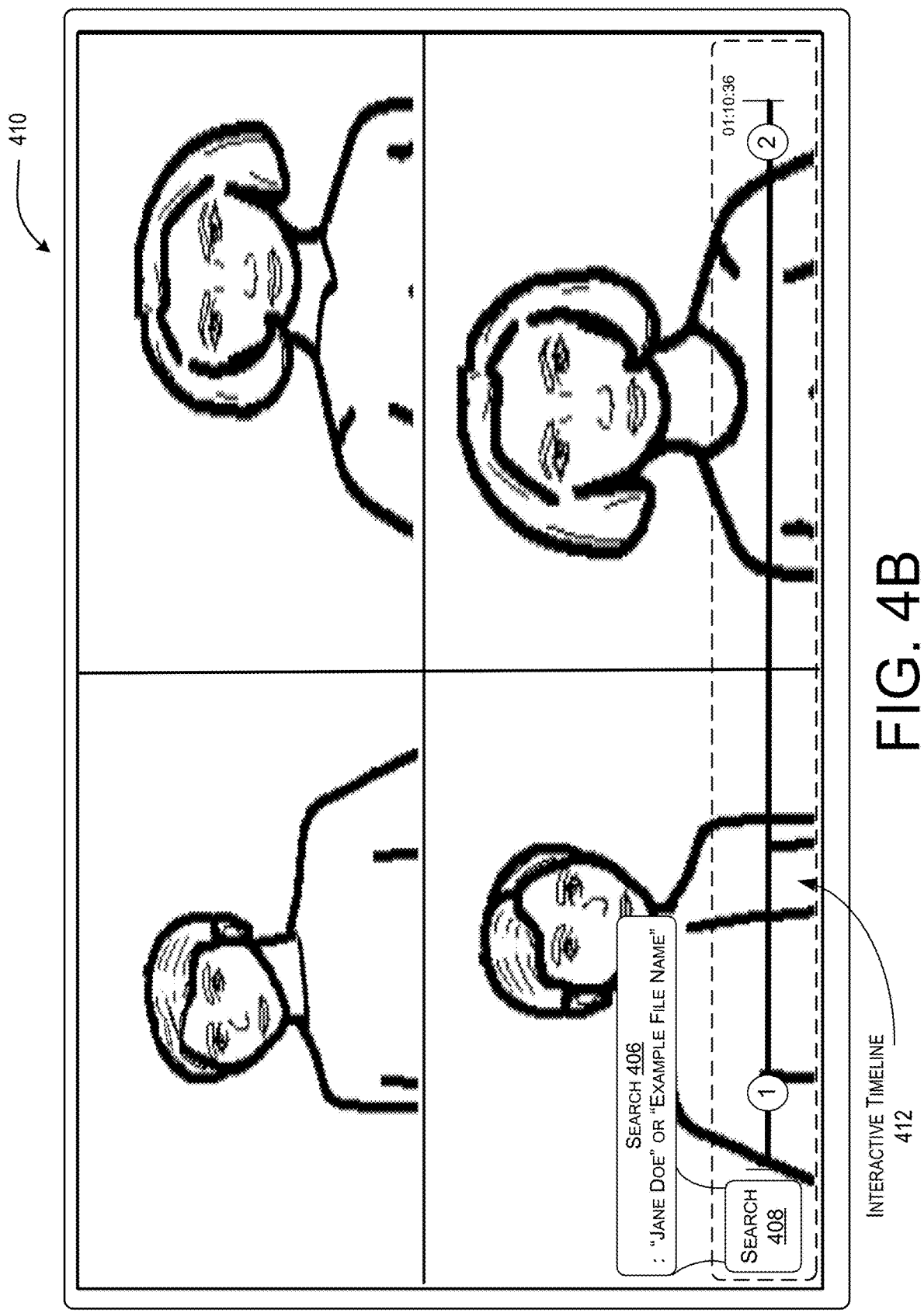
FIG. 4B illustrates an example graphical user interface configured to display an interactive timeline and a search field that enables a user to enter search input as a basis for a search request.

FIG. 4B illustrates an example graphical user interface 410 in which an interactive timeline 412 has been updated based on the search request. That is, the interactive timeline module 146 searches for and locates instances of a specific notable event that is being searched for by a user. The user can alternatively enter text that causes the interactive timeline module 146 to search for a broader type of notable event. In FIG. 4B, the representation labeled "1" that remains on the interactive timeline 412 corresponds to an instance in which Jane Doe is mentioned (e.g., "@jane). The representation labeled "2" that remains on the interactive timeline 412 corresponds to an instance in which "Example File Name" is shared. Removing, from the interactive timeline 412, instances of other representations that are not searched for allows the update to the interactive timeline 412 to graphically accentuate the representations that are searched for by a user.

In various examples, the interactive timeline module 146 can search transcripts associated with recorded teleconference sessions to locate instances of specific notable events that are being searched for by the user. In some instances, the transcripts can be translated from a first language in which the teleconference session was conducted into a second language in which search input is provided by the user.

Figure 5A:
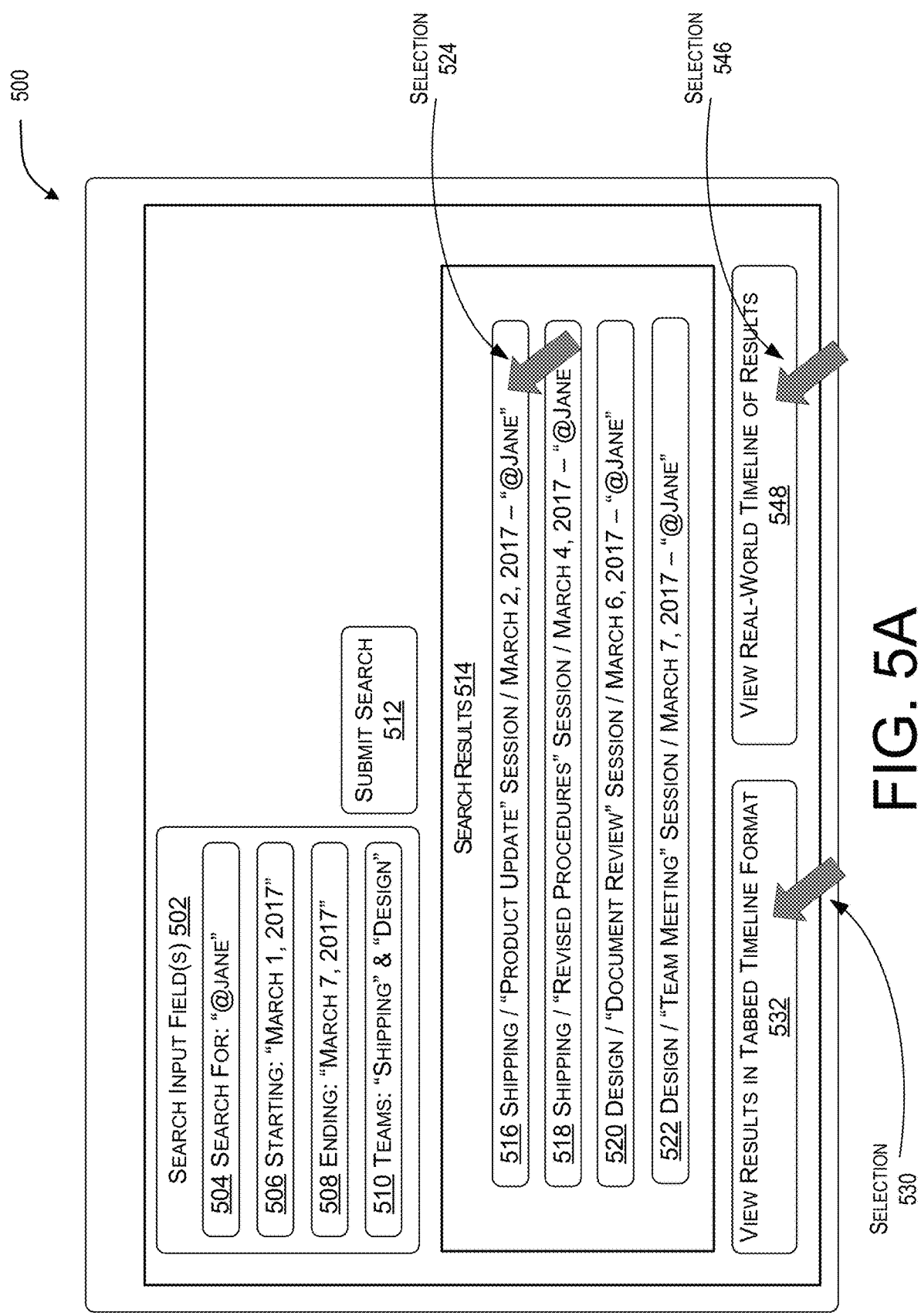
FIG. 5A illustrates an example graphical user interface in which a user can submit input that causes a search of a collaboration environment to be implemented.

FIG. 5A illustrates an example graphical user interface 500 in which a user can submit input that causes a search of a collaboration environment to be implemented. As described above, the collaboration environment can comprise functionality and/or tools that enable a group of users to collaborate and interact in a social or a work setting (e.g., teleconferencing applications, chat applications, document sharing and storage applications, etc.). Accordingly, the system is configured to search multiple different recorded teleconference sessions and/or chat conversations for instances of a type of notable event and/or for instances of a specific notable event that the user desires to view.

The graphical user interface 500 includes search input field(s) 502 for a user to enter parameters of a search. For example, a first search input field 504 can enable a user to enter a type of notable event and/or a specific notable event to search for (e.g., "@jane"). A second and/or a third search input field 506 and 508 can enable a user to enter a time period to be searched (e.g., "Mar. 1, 2017 through Mar. 7, 2017"). For instance, a user may want to view desirable activity that the user missed while on vacation (e.g., meetings in which the user's name is mentioned). A fourth search input 510 field can enable a user to enter teams or groups of users for which collaboration material (e.g., recorded teleconference sessions and/or chat conversations) are to be searched (e.g., "Shipping" & "Design" Teams). After a user has provided input for the search request, the user selects a submit search option 512. The interactive timeline module 146 then searches the collaboration material (e.g., recorded teleconference sessions, chat conversations, and interactive timelines associated therewith) based on the search parameters to find instances of notable events that match the search request.

In various examples, the interactive timeline module 146 provides search results 514 to the search request that list the recorded teleconference sessions and/or chat conversations that include at least one instance of a type of notable event and/or a specific notable event being searched for. For instance, the search results 514 provide a first teleconference session 516 in which the "Shipping" Team conducted a meeting on Mar. 2, 2017 with a subject/title of "Product Update", the interactive timeline or transcript of which includes a mention of Jane. The search results 514 provide a second teleconference session 518 in which the "Shipping" Team conducted a meeting on Mar. 4, 2017 with a subject/title of "Revised Procedures", the interactive timeline or transcript of which includes a mention of Jane. The search results 514 provide a third teleconference session 520 in which the "Design" Team conducted a meeting on Mar. 6, 2017 with a subject/title of "Document Review", the interactive timeline or transcript of which includes a mention of Jane. And the search results 514 provide a fourth teleconference session 522 in which the "Design" Team conducted a meeting on Mar. 7, 2017 with a subject/title of "Team Meeting", the interactive timeline or transcript of which includes a mention of Jane.

Figure 5B:
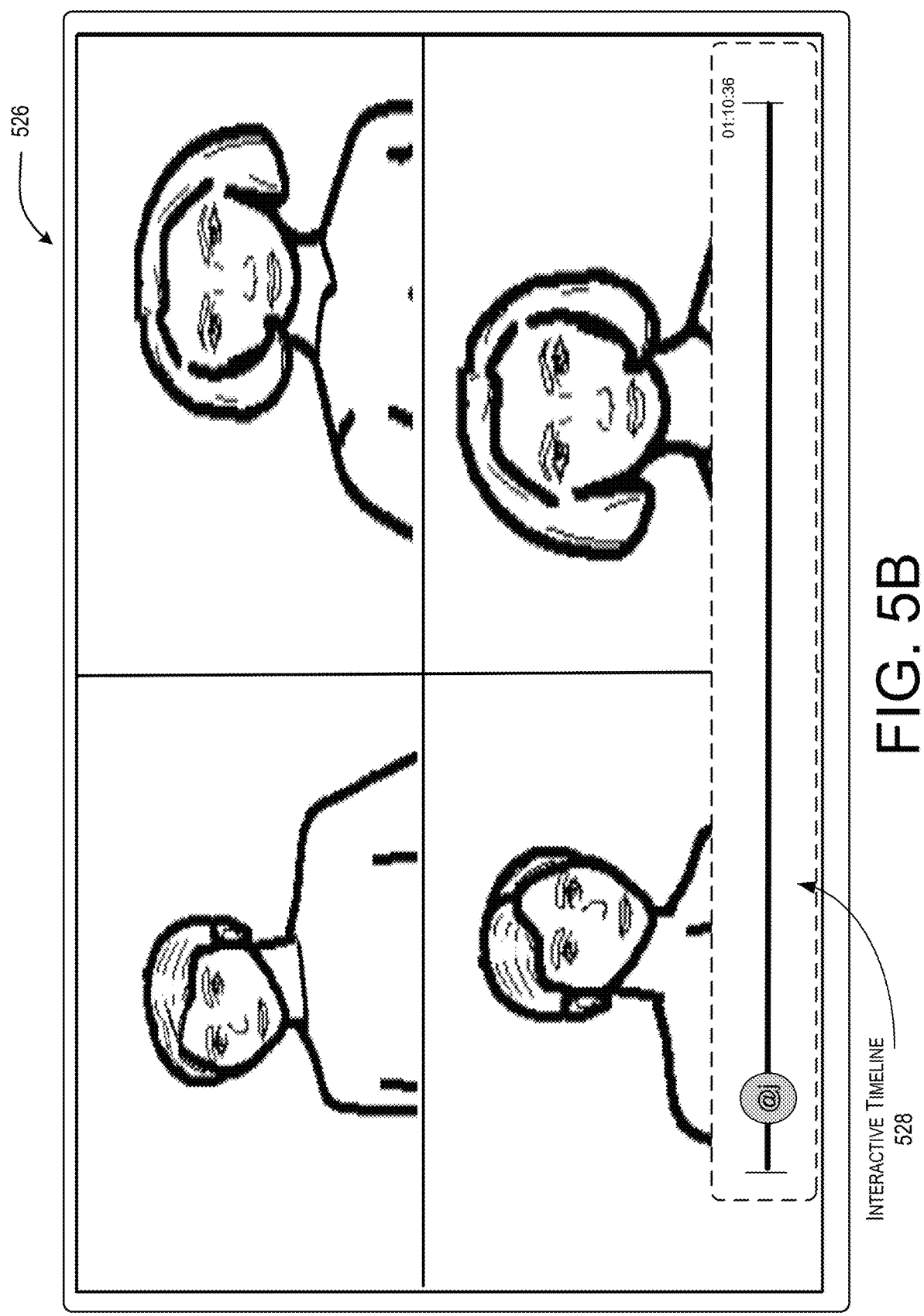
FIG. 5B illustrates an example graphical user interface displaying a configuration in which results of the search can be accessed and viewed.

Upon viewing the search results 514, the user can make a selection 524 of a recorded teleconference session and/or a chat conversation from the results listed and view a corresponding interactive timeline and/or recorded content, as shown in the example graphical user interface 526 of FIG. 5B. That is, the graphical user interface 526 includes an interactive timeline 528 with representations (e.g., "@j" or "@jane") representing instances of a type of notable event or a specific notable event being searched for (e.g., instances of other types of notable events and/or instances of other specific notable events not searched for are removed from view or graphically distinguished).

Going back to FIG. 5A, in other examples, the user can make a selection 530 of an option 532 to view results in a tabbed timeline format, as shown in the example graphical user interface 534 of FIG. 5C. The graphical user interface 534 includes tabs that enable a user to switch between interactive timelines associated with the teleconference sessions listed in the search results 514. For instance, a first tab 536 is associated with the first teleconference session 516 in which the "Shipping" Team conducted a meeting on Mar. 2, 2017 with a subject/title of "Product Update". The second tab 538 is associated with the second teleconference session 518 in which the "Shipping" Team conducted a meeting on Mar. 4, 2017 with a subject/title of "Revised Procedures". The third tab 540 is associated with the third teleconference session 520 in which the "Design" Team conducted a meeting on Mar. 6, 2017 with a subject/title of "Document Review". And the fourth tab 542 is associated with the fourth teleconference session 522 in which the "Design" Team conducted a meeting on Mar. 7, 2017 with a subject/title of "Team Meeting". As shown in FIG. 5C, the active tab comprises the second tab 538, and thus, the user can view instances of the notable event that was searched for (e.g., "@j" or "@jane") on an interactive timeline 544 associated with the "Revised Procedures" meeting on Mar. 4, 2017 for the "Shipping" Team. The displayed content associated with the active tab in this example comprises three recorded streams of people interacting during a teleconference session, and one recorded stream of file content (e.g., a slide that explains "Total Shipments by Quarter") that is shared during the teleconference session.

Figure 5D:
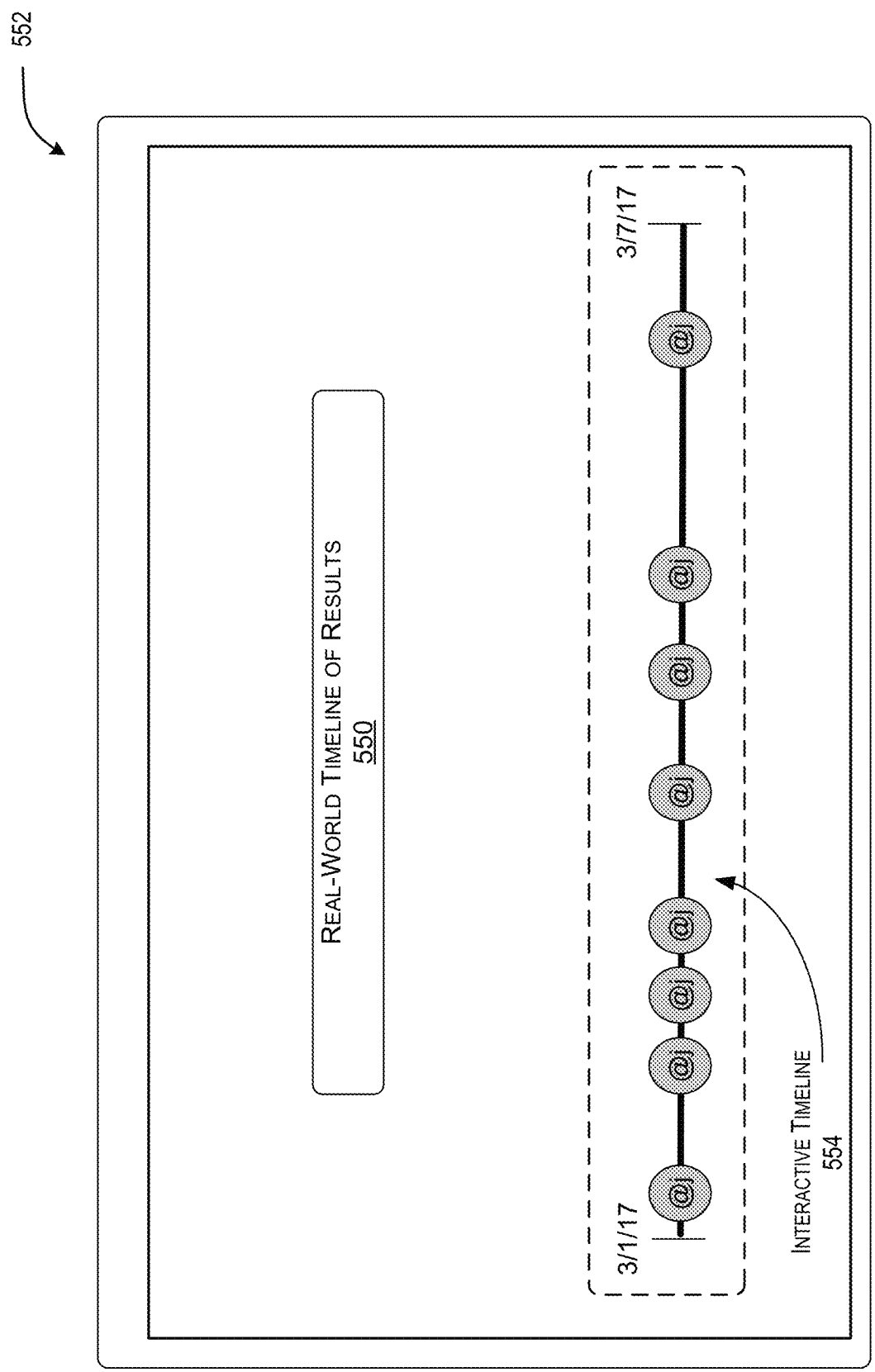
FIG. 5D illustrates yet another example graphical user interface displaying a configuration in which results of the search can be accessed and viewed.

Going back to FIG. 5A, in additional examples, the user can make a selection 546 of an option 548 to view a real-world timeline of results 550, as shown in the example graphical user interface 552 of FIG. 5D. The graphical user interface 552 includes, on an interactive timeline 554, all the instances of the type of notable event and/or the specific notable event searched for based on a time period defined in the search request (e.g., Mar. 1, 2017 through Mar. 7, 2017). The timeline is referred to as a "real-world" timeline at least because it represents a real-world time period (e.g., Mar. 1, 2017 through Mar. 7, 2017) rather than a duration of a teleconference session, for example. And the representations of "@" shown can be spread across multiple different teleconference sessions and/or chat conversations, timestamped with respect to a real-world time (e.g., between Mar. 1, 2017 and Mar. 7, 2017) when they occur.

In various examples, an interactive timeline is configured such that a user can select a representation to view more information about the notable event, to move an interactive timeline cursor to a position where the representation is located on the interactive timeline to view corresponding recorded content, and/or to be directed to a particular teleconference session in which the notable event occurs.

Figure 6:
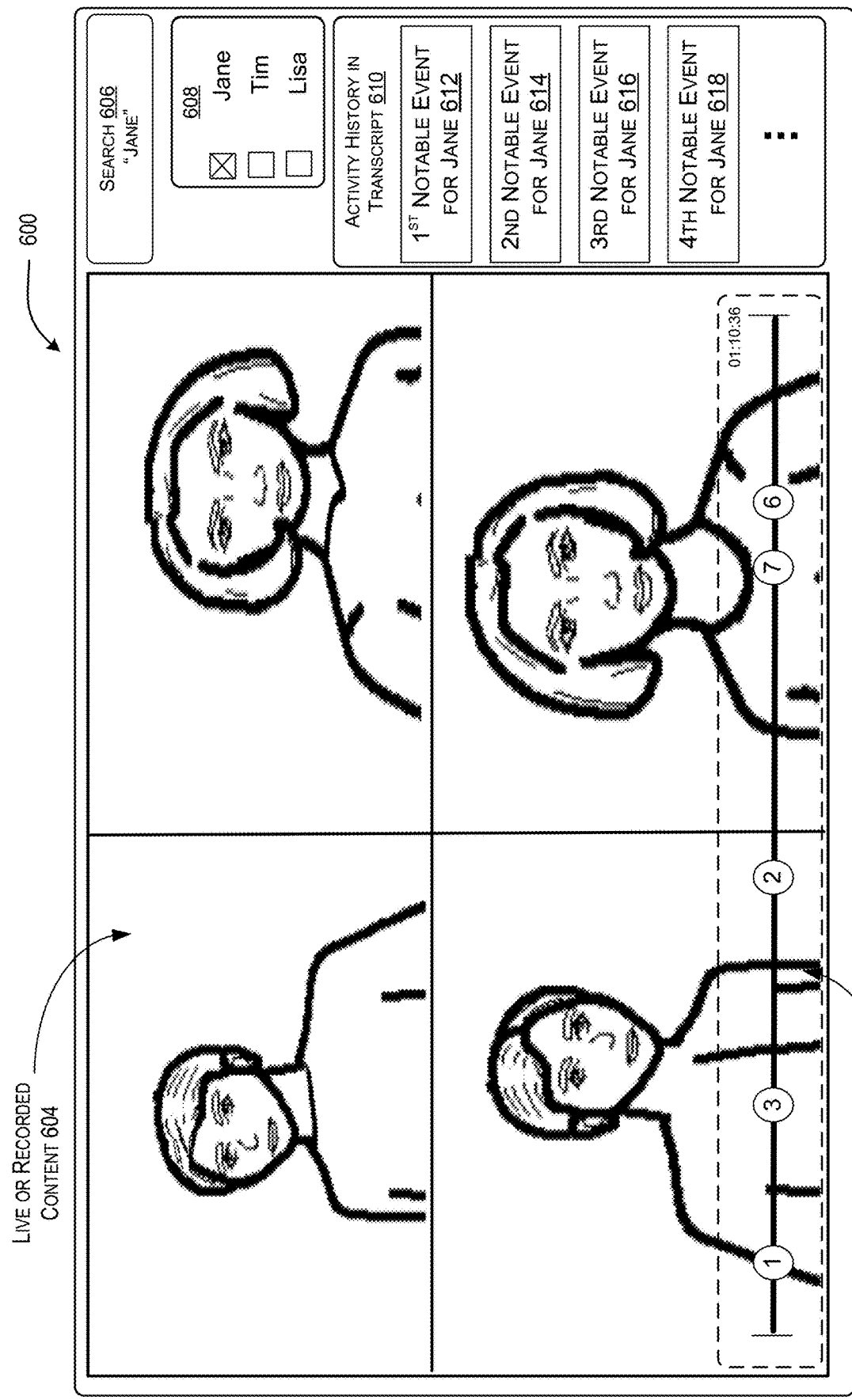
FIG. 6 illustrates an example graphical user interface configured to enable a user to search and/or filter an interactive timeline associated with recorded or live content of a teleconference session based on an individual person.

FIG. 6 illustrates an example graphical user interface 600 configured to enable a user to search and/or filter an interactive timeline 602 associated with recorded or live content 604 of a teleconference session based on an individual person. In this example, the search and/or filter is configured to find and graphically accentuate any activity (e.g., notable events) associated with the person (e.g., activity directed to the person, activity the person contributes to the teleconference session and/or the interactive timeline, etc.).

As shown, the user can enter identifying information such as the text "Jane" in a search field 606 associated with a search option. Alternatively, the use can define a filter setting in accordance with a visual element 608 associated with a filter option, the filter setting indicating that the user desires to find and view activity for Jane (e.g., as opposed to the activity of Tim or Lisa). In response to the search request or filter request, the interactive timeline 602 can be updated to accentuate the activity of Jane (e.g., by removing activity of other persons such as Tim and Lisa from the interactive timeline 602). For example, the first notable event on the interactive timeline 602 labeled "1" can be an "@mention" of Jane by a participant to the teleconference session, the second notable event on the interactive timeline 602 labeled "3" can be a comment submitted by Jane to a chat conversation associated with the teleconference session, the third notable event on the interactive timeline 602 labeled "2" can be a file that Jane shares during the teleconference session, the fourth notable event on the interactive timeline 602 labeled "7" can be an expression shared by Jane during the teleconference session, and the fifth notable event on the interactive timeline 602 labeled "6" can be a link to another meeting Jane provides during the teleconference session (e.g., the labeled numbers "1", "3", "2", "7", and "6" correspond to the example types of notable events illustrated in FIG. 3A).

In various examples, to provide an additional view into the activity of Jane, the graphical user interface 600 can display Jane's activity history in a transcript 610 of the teleconference session. As described above, the transcript of a teleconference session includes text and can be generated based on one or more of spoken dialogue during the teleconference session, comments submitted to a chat conversation conducted in accordance with the teleconference session, content of files shared during a teleconference session (e.g., text of a document). Activity, such as notable events, can be timestamped and added to the transcript. Accordingly, when the user submits a search request and/or filter request to locate and view Jane's activity, the transcript can be searched and/or filtered and corresponding pieces of text or other information that surround a notable event (e.g., snippets) can be displayed in the activity history in the transcript 610 of the teleconference session. That is, text or other information associated with the first notable event for Jane 612 can be displayed, this text or other information corresponding to the first notable event labeled "1" on the interactive timeline 602. Text or other information associated with the second notable event for Jane 614 can be displayed, this text or other information corresponding to the second notable event labeled "3" on the interactive timeline 602. Text or other information associated with the third notable event for Jane 616 can be displayed, this text or other information corresponding to the third notable event labeled "2" on the interactive timeline 602. Text or other information associated with the fourth notable event for Jane 618 can be displayed, this text or other information corresponding to the fourth notable event labeled "7" on the interactive timeline 602. The activity history in the transcript 610 can be scrolled so the user can see subsequent text or other information associated with subsequent notable events on the interactive timeline 602.

Figure 7:
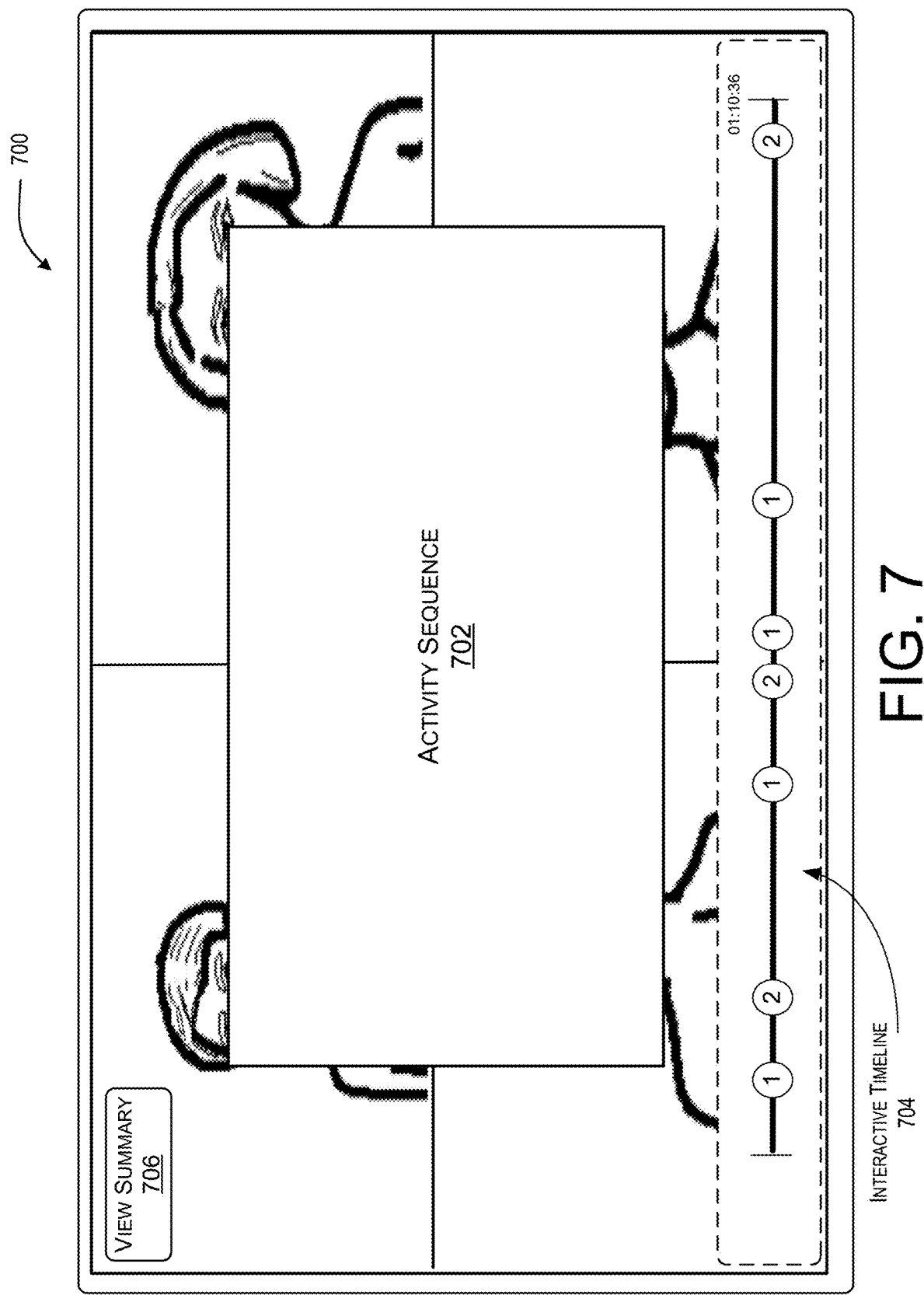
FIG. 7 illustrates an example graphical user interface configured to display an activity sequence that summarizes desirable activity displayed on an interactive timeline.

FIG. 7 illustrates an example graphical user interface 700 configured to display an activity sequence 702 based on the desirable activity that is graphically accentuated on an interactive timeline 704. The activity sequence 702 summarizes the notable events represented on the interactive timeline 704, and thus, playback and user consumption of the activity sequence 702 provides the user with an efficient means to gain a general awareness and understanding of the desirable activity that occurred in a teleconference session or in a collaboration environment without requiring the user to view and/or listen to all the recorded content (e.g., of the teleconference session that the user missed). Accordingly, after the interactive timeline 704 is displayed based on a filter request or a search request, a user can select an option to view a summary 706 of the desirable activity represented on the interactive timeline, and the activity sequence 702 can be generated and displayed.

Figure 8:
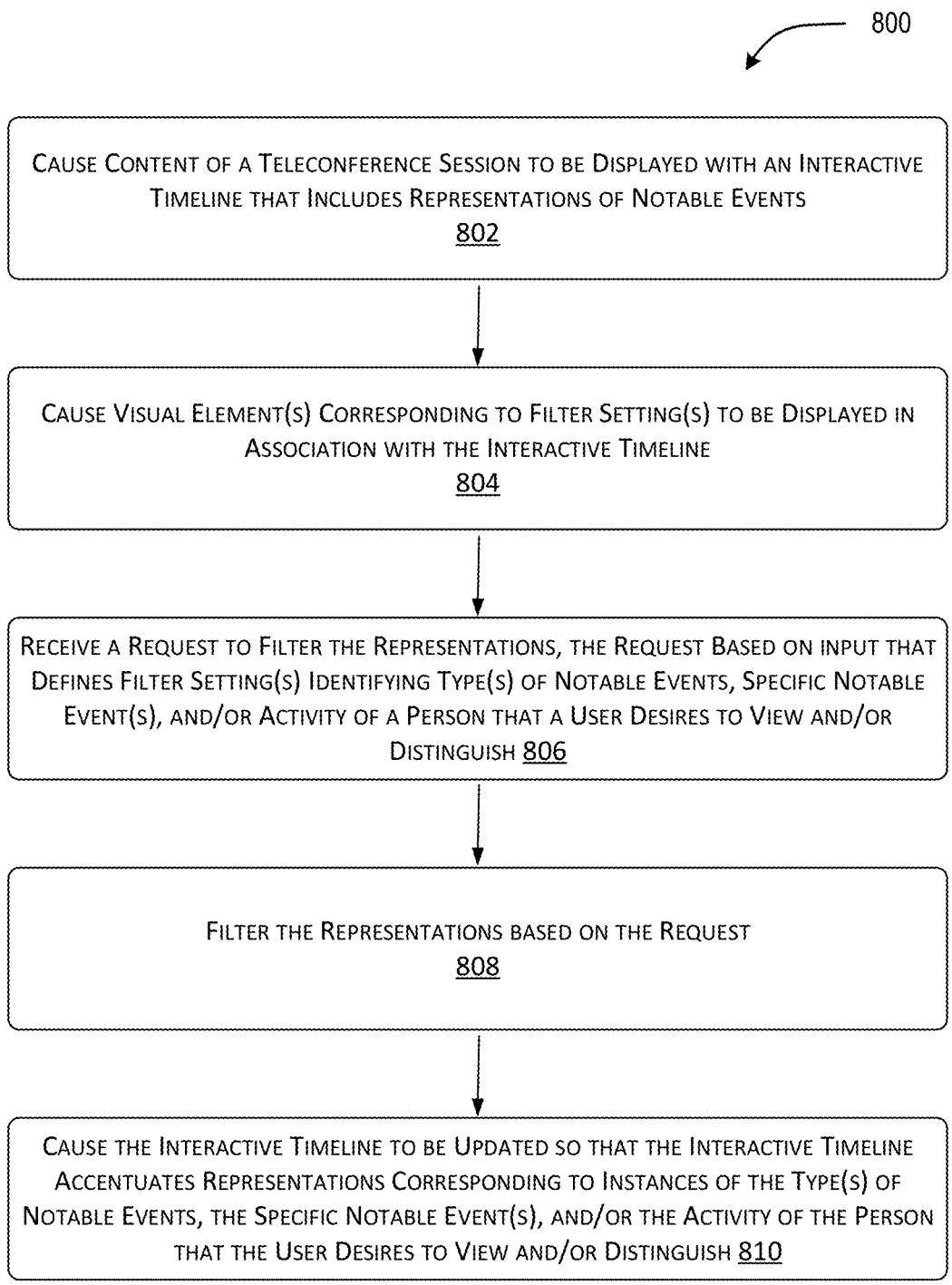
FIG. 8 is a diagram of an example flowchart that illustrates operations directed to causing an interactive timeline to be displayed based on a filter request.
Figure 9:
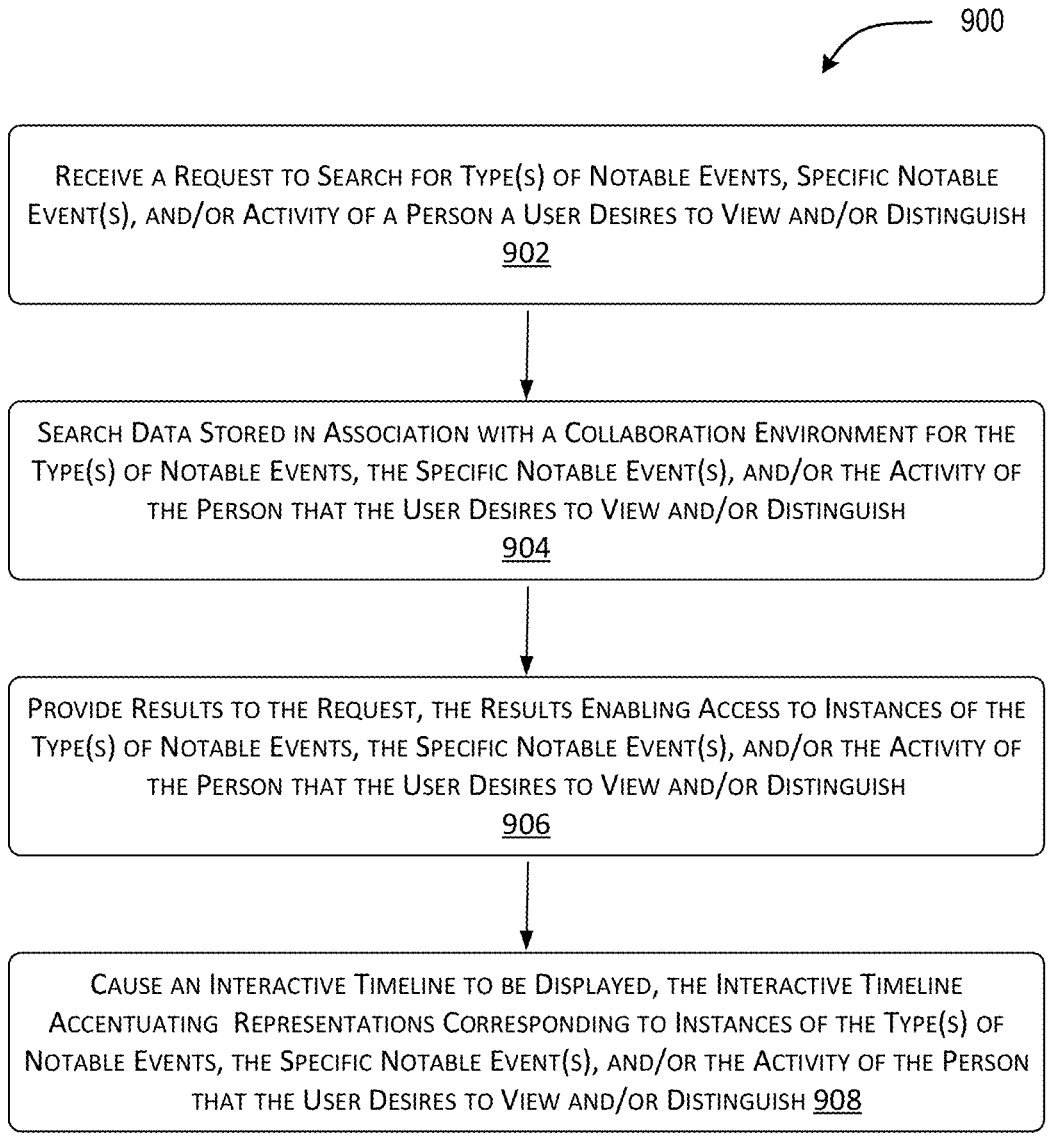
FIG. 9 is a diagram of an example flowchart that illustrates operations directed to causing an interactive timeline to be displayed based on a search request.

FIGS. 8 and 9 illustrate example flowcharts. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., device 110, client computing device 106(N), and/or device 200) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIGS. 8 and/or 9 can be implemented in association with the example graphical user interfaces described above with respect to FIGS. 3A-7. For instance, the various device(s) and/or module(s) in FIGS. 1 and/or 2 can generate, transmit, receive, and/or display data associated with content of a teleconference session (e.g., live content, recorded content, etc.) and/or an interactive timeline that includes representations of notable events.

FIG. 8 is a diagram of an example flowchart 800 that illustrates operations directed to causing an interactive timeline to be displayed based on a filter request. In one example, the operations of FIG. 8 can be performed by components of the system 102 and/or a client computing device 106(N).

At operation 802, content of a teleconference session is caused to be displayed via a client computing device along with an interactive timeline that includes representations of notable events. FIG. 3A provides an example of content and an interactive timeline.

At operation 804, visual elements corresponding to filter settings are caused to be displayed in association with the interactive timeline. FIGS. 3A-3F, as well as FIG. 6, provide examples of visual elements.

At operation 806, a request to filter the representations on the interactive timeline is received. The request is based on input that defines the filter settings which identify types of notable events, specific notable events, and/or activity of a person that a user desires to view and/or distinguish on the interactive timeline. FIGS. 3B-3F, as well as FIG. 6, provide examples of input that defines the filter settings.

At operation 808, the representations on the interactive timeline are filtered based on the request to filter.

At operation 810, the interactive timeline is caused to be updated so that the interactive timeline accentuates representations corresponding to instances of the types of notable events, the specific notable events, and/or the activity of the person that the user desires to view and/or distinguish.

FIG. 9 is a diagram of an example flowchart 900 that illustrates operations directed to causing an interactive timeline to be displayed based on a search request. In one example, the operations of FIG. 9 can be performed by components of the system 102 and/or a client computing device 106(N).

At operation 902, a request to search for types of notable events, specific notable events, and/or activity of a person that a user desires to view and/or distinguish on an interactive timeline is received. FIGS. 4A-4B, 5A, and 6 provide examples of input that provides a basis for such a search request.

At operation 904, data stored in association with a collaboration environment is searched for the types of notable events, the specific notable events, and/or the activity of the person that the user desires to view and/or distinguish on the interactive timeline. As described above, the data can comprise recorded teleconference sessions and/or chat conversations, and interactive timelines associated therewith.

At operation 906, results to the search request are provided and/or displayed. The results enable a user to access instances of the types of notable events, the specific notable events, and/or the activity of the person searched for.

At operation 908, an interactive timeline is caused to be displayed, the interactive timeline accentuating representations corresponding to instances of the types of notable events, the specific notable events, and/or the activity of the person that the user desires to view and/or distinguish. The interactive timeline can be displayed based on user selection of an option, examples of which are described above with respect to FIGS. 5A-5D.

The disclosure presented herein may be considered in view of the following example clauses.

Example Clause A, a system comprising: one or more processing units; and a computer-readable medium having encoded thereon computer-executable instructions to cause the one or more processing units to: cause an interactive timeline associated with a teleconference session to be displayed via a client computing device, wherein the interactive timeline includes a plurality of representations that correspond to a plurality of notable events associated with the teleconference session; receive, from the client computing device, a request to filter the plurality of representations; based at least in part on receiving the request to filter, filter the plurality of representations included in the interactive timeline to determine one or more representations of the plurality of representations; and cause the interactive timeline to be updated such that the one or more representations are graphically accentuated.

Example Clause B, the system of Example Clause A, wherein causing the interactive timeline to be updated such that the one or more representations are graphically accentuated comprises continuing to display the one or more representations on the interactive timeline while removing one or more other representations of the plurality of representations from the interactive timeline.

Example Clause C, the system of Example Clause A, wherein causing the interactive timeline to be updated such that the one or more representations are graphically accentuated comprises causing the one or more representations to be graphically distinguished on the interactive timeline from one or more other representations of the plurality of representations.

Example Clause D, the system of any one of Example Clauses A through C, wherein the computer-executable instructions further cause the one or more processing units to cause recorded content or live content to be displayed in association with the interactive timeline.

Example Clause E, the system of any one of Example Clauses A through D, wherein the request to filter comprises a filter setting for a type of notable event to be represented on the interactive timeline, at least one of the one or more representations corresponding to an instance of the type of notable event.

Example Clause F, the system of Example Clause E, wherein the computer-executable instructions further cause the one or more processing units to cause a visual element corresponding to the type of notable event to be displayed, the filter setting being enabled based on a selection of the visual element.

Example Clause G, the system of Example Clause E or Example Clause F, wherein the type of notable event comprises one of: a mention of a user, a mention of a team, a file or a display screen that is shared, a comment that is submitted, a task that is assigned, a poll that is conducted, an expression that is shared, a link to an external object, a user joining a teleconference session, a user leaving a teleconference session, a video that is injected into a recording of a teleconference session, an explicit flag or meta tag added to the interactive timeline, or recognition that a particular voice begins to speak.

Example Clause H, the system of any one of Example Clauses A through D, wherein the request to filter comprises a filter setting for a specific notable event, at least one of the one or more representations corresponding to an instance of the specific notable event.

Example Clause I, the system of Example Clause H, wherein the computer-executable instructions further cause the one or more processing units to cause a visual element corresponding to a characteristic of the specific notable event to be displayed, the filter setting being enabled based on a selection of the visual element.

Example Clause J, the system of any one of Example Clauses A through D, wherein the request to filter comprises a filter setting for an individual person, the one or more representations corresponding to one or more notable events associated with the individual person.

While the subject matter of Example Clauses A through J is described above with respect to a system, it is understood in the context of this document that the subject matter of Example Clauses A through J can be implemented by a device, as a method, and/or via computer-readable storage media.

Example Clause K, a system comprising: one or more processing units; and a computer-readable medium having encoded thereon computer-executable instructions to cause the one or more processing units to: receive, from a client computing device, a request to search for a type of notable event or for a specific notable event, the request generated based on one or more inputs into one or more search fields; search recordings of a plurality of teleconference sessions of a collaboration environment for instances of the type of notable event or of the specific notable event; provide, as results to the request, one or more teleconference sessions of the plurality of teleconference sessions that individually comprise at least one instance of the type of notable event or of the specific notable event; and cause an interactive timeline associated with one of the one or more teleconference sessions to be displayed via the client computing device, wherein the interactive timeline includes at least one representation that corresponds to the at least one instance of the type of notable event or of the specific notable event.

Example Clause L, the system of Example Clause K, wherein searching the recordings of the plurality of teleconference sessions for instances of the type of notable event or of the specific notable event comprises searching a plurality of interactive timelines corresponding to the recordings of plurality of teleconference sessions.

Example Clause M, the system of Example Clause K or Example Clause L, wherein an individual search field comprises a time period search field and a corresponding input into the time period search field defines a time period in which each of the plurality of teleconference sessions occurs.

Example Clause N, the system of any one of Example Clauses K through M, wherein an individual search field comprises a team search field and a corresponding input into the team search field defines one or more teams for which each of the plurality of teleconference sessions is conducted.

Example Clause O, the system of any one of Example Clauses K through N, wherein the computer-executable instructions further cause the one or more processing units to receive a selection of the one of the one or more teleconference sessions to be displayed via the client computing device, wherein causing the interactive timeline associated with the one of the one or more teleconference sessions to be displayed via the client computing device is based at least in part on the selection.

Example Clause P, the system of any one of Example Clauses K through O, wherein the interactive timeline graphically distinguishes between the at least one representation that corresponds to the at least one instance of the type of notable event or of the specific notable event and other representations that correspond to instances of other notable events.

Example Clause Q, the system of any one of Example Clauses K through O, wherein other representations that correspond to instances of other notable events or other specific notable events have been removed from the interactive timeline to accentuate the at least one representation that corresponds to the at least one instance of the type of notable event or of the specific notable event.

While the subject matter of Example Clauses K through Q is described above with respect to a system, it is understood in the context of this document that the subject matter of Example Clauses K through Q can be implemented by a device, as a method, and/or via computer-readable storage media.

Example Clause R, a system comprising: one or more processing units; and a computer-readable medium having encoded thereon computer-executable instructions to cause the one or more processing units to: receive, from a client computing device, a request to search for a type of notable event or for a specific notable event, the request generated based on one or more inputs into one or more search fields, wherein at least one input defines a time period; search data of a collaboration environment for instances of the type of notable event or of the specific notable event that occur within the time period; and cause an interactive timeline associated with the time period to be displayed via the client computing device, wherein the interactive timeline includes representations that correspond to the instances of the type of notable event or of the specific notable event.

Example Clause S, the system of Example Clause R, wherein other representations that correspond to instances of other types of notable events or other specific notable events have been removed from the interactive timeline to accentuate the representations that correspond to the instances of the type of notable event or of the specific notable event.

Example Clause T, the system of Example Clause R or Example Clause S, wherein the computer-executable instructions further cause the one or more processing units to: generate an activity sequence based on the representations that correspond to the instances of the type of notable event or of the specific notable event; and cause the activity sequence to be displayed via the client computing device.

While the subject matter of Example Clauses R through T is described above with respect to a system, it is understood in the context of this document that the subject matter of Example Clauses R through T can be implemented by a device, as a method, and/or via computer-readable storage media.

Although the techniques have been described in language specific to structural features and/or methodological acts, it is to be understood that the appended claims are not necessarily limited to the features or acts described. Rather, the features and acts are described as example implementations of such techniques.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processing units; and
a computer-readable medium having encoded thereon computer-executable instructions to cause the one or more processing units to:
receive, from a client computing device, a request generated based on one or more search parameters;
search video data based at least in part on the one or more search parameters; and
cause an interactive timeline that includes instances of at least two types of events, identified in the video data based on the searching, to be displayed via the client computing device, wherein:
the instances of the at least two types of events are timestamped with respect to real-world times when the instances of the at least two types of events occur;
the at least two types of events comprise at least two of: a mention of a user identification, a file that is shared, a display screen that is shared, a task that is assigned, a poll that is conducted, a video clip that is injected into a recording of a communication session, or a recognition that a particular voice begins to speak; and each of the instances of the at least two types of events included on the interactive timeline is labeled with one of at least two different icons that respectively represent the at least two types of events.

2. The system of claim 1, wherein other instances of other types of events have been removed from the interactive timeline to accentuate the instances of the at least two types of events.

3. The system of claim 1, wherein the computer-executable instructions further cause the one or more processing units to:

generate an activity sequence based on the instances of the at least two types of events; and cause the activity sequence to be displayed via the client computing device.

4. The system of claim 1, wherein the video data comprises a plurality of communication sessions.

5. The system of claim 4, wherein:

the one or more search parameters comprise a real-world time period; and the plurality of communication sessions each occur within the real-world time period.

6. The system of claim 4, wherein searching the video data comprises searching a plurality of interactive timelines corresponding to the plurality of communication sessions.

7. The system of claim 1, wherein:

the one or more search parameters comprises a team of users within a collaboration environment; and the video data comprises video files produced by the team of users.

8. The system of claim 1, wherein the computer-executable instructions further cause the one or more processing units to:

receive a selection of an icon that labels an instance of a type of event; and cause, based in part on the selection, a corresponding video in which the instance of the type of event occurs to be displayed on the client computing device.

9. A method comprising:

receiving, from a client computing device, a request generated based on one or more search parameters;

searching video data based at least in part on the one or more search parameters; and causing an interactive timeline that includes instances of at least two types of events, identified in the video data based on the searching, to be displayed via the client computing device, wherein:

the instances of the at least two types of events are timestamped with respect to real-world times when the instances of the at least two types of events occur;

the at least two types of events comprise at least two of: a mention of a user identification, a file that is shared, a display screen that is shared, a task that is assigned, a poll that is conducted, a video clip that is injected into a recording of a communication session, or a recognition that a particular voice begins to speak; and each of the instances of the at least two types of events included on the interactive timeline is labeled with one of at least two different icons that respectively represent the at least two types of events.

10. The method of claim 9, further comprising:

generating an activity sequence based on the instances of the at least two types of events; and causing the activity sequence to be displayed via the client computing device.

11. The method of claim 9, wherein the video data comprises a plurality of communication sessions.

12. The method of claim 11, wherein:

the one or more search parameters comprise a real-world time period; and the plurality of communication sessions each occur within the real-world time period.

13. The method of claim 9, wherein:

the one or more search parameters comprises a team of users within a collaboration environment; and the video data comprises video files produced by the team of users.

14. The method of claim 9, further comprising:

receiving a selection of an icon that labels an instance of a type of event; and causing, based in part on the selection, a corresponding video in which the instance of the type of event occurs to be displayed on the client computing device.

15. One or more computer-readable storage media storing instructions that, when executed by one or more processing units, cause a system to perform operations comprising:

receiving, from a client computing device, a request generated based on one or more search parameters;

searching video data based at least in part on the one or more search parameters; and causing an interactive timeline that includes instances of at least two types of events, identified in the video data based on the searching, to be displayed via the client computing device, wherein:

the instances of the at least two types of events are timestamped with respect to real-world times when the instances of the at least two types of events occur;

the at least two types of events comprise at least two of: a mention of a user identification, a file that is shared, a display screen that is shared, a task that is assigned, a poll that is conducted, a video clip that is injected into a recording of a communication session, or a recognition that a particular voice begins to speak; and each of the instances of the at least two types of events included on the interactive timeline is labeled with one of at least two different icons that respectively represent the at least two types of events.

16. The one or more computer-readable storage media of claim 15, wherein the operations further comprise:

generating an activity sequence based on the instances of the at least types of events; and causing the activity sequence to be displayed via the client computing device.

17. The one or more computer-readable storage media of claim 15, wherein the video data comprises a plurality of communication sessions.

18. The one or more computer-readable storage media of claim 17, wherein:

the one or more search parameters comprise a real-world time period; and the plurality of communication sessions each occur within the real-world time period.

19. The one or more computer-readable storage media of claim 15, wherein:

the one or more search parameters comprises a team of users within a collaboration environment; and the video data comprises video files produced by the team of users.

20. The one or more computer-readable storage media of claim 15, having additional instructions encoded thereon that cause the system to perform operations comprising:
   receiving a selection of an icon that labels an instance of a type of event; and
   causing, based in part on the selection, a corresponding video in which the instance of the type of event occurs to be displayed on the client computing device.

* * * * *